(12) United States Patent
Xiao

(10) Patent No.: US 11,889,050 B2
(45) Date of Patent: Jan. 30, 2024

(54) IMAGE DISPLAY CONTROL METHOD, IMAGE DISPLAY CONTROL APPARATUS, AND HEAD-MOUNTED DISPLAY DEVICE

(71) Applicant: MATRIXED REALITY TECHNOLOGY CO., LTD., Wuxi (CN)

(72) Inventor: Bing Xiao, Beijing (CN)

(73) Assignee: MATRIXED REALITY TECHNOLOGY CO., LTD., Wuxi (CN)

( * ) Notice: Subject to any disclaimer, the term of this patent is extended or adjusted under 35 U.S.C. 154(b) by 0 days.

(21) Appl. No.: 18/003,915

(22) PCT Filed: Jul. 22, 2021

(86) PCT No.: PCT/CN2021/107811
§ 371 (c)(1),
(2) Date: Dec. 30, 2022

(87) PCT Pub. No.: WO2022/017447
PCT Pub. Date: Jan. 27, 2022

(65) Prior Publication Data
US 2023/0319256 A1    Oct. 5, 2023

(30) Foreign Application Priority Data

Jul. 24, 2020 (CN) .......................... 202010721991.8

(51) Int. Cl.
*H04N 13/344* (2018.01)
*G06T 5/20* (2006.01)
(Continued)

(52) U.S. Cl.
CPC ........... *H04N 13/344* (2018.05); *G06T 5/002* (2013.01); *G06T 5/20* (2013.01); *H04N 13/363* (2018.05)

(58) Field of Classification Search
CPC .... H04N 13/344; H04N 13/363; G06T 5/002; G06T 5/20
See application file for complete search history.

(56) References Cited

U.S. PATENT DOCUMENTS 5,880,711 A      3/1999   Tamada
2019/0335167 A1* 10/2019  Fateh ................... H04N 13/344

FOREIGN PATENT DOCUMENTS

CN          103487939 B      4/2016
CN          106681512 A      5/2017
(Continued)

OTHER PUBLICATIONS

International Search Report received in the corresponding International Application PCT/CN2021/107811, dated Oct. 21, 2021.
(Continued)

*Primary Examiner* — Yaron Cohen
(74) *Attorney, Agent, or Firm* — Kilpatrick Townsend & Stockton LLP

(57) ABSTRACT

An image display control method and apparatus, and a head-mounted display device (200). The head-mounted display device (200) includes an optical imaging apparatus (210), an image source apparatus (230), a displacement apparatus (220) and an image display control apparatus (240). The image source apparatus (230) is optically aligned with the optical imaging apparatus (210), and has a plurality of source images. Each source image has a different virtual scene depth. The image display control method includes: determining a displacement sequence of a displacement apparatus (220) and a source image display sequence (610) of an image source apparatus (230), based on a virtual scene display depth range; controlling the displacement apparatus (220) to move, according to the displacement sequence, the image source apparatus (230) to corresponding target positions (620); and after the image source apparatus (230)
(Continued)

reaches each of the target positions, controlling, according to the source image display sequence, the image source apparatus (230) to perform source image projection, so as to display a clear virtual image of a source image, corresponding to the target position, in the source image display sequence (630). By using the method, dynamic display of virtual images on virtual scene depth planes can be achieved.

20 Claims, 16 Drawing Sheets

(51) Int. Cl.
*H04N 13/363* (2018.01)
*G06T 5/00* (2006.01)

(56) References Cited

FOREIGN PATENT DOCUMENTS

| | | |
|---|---|---|
| CN | 107783291 A | 3/2018 |
| CN | 110109260 A | 8/2019 |
| CN | 110494790 A | 11/2019 |
| CN | 110727111 A | 1/2020 |
| CN | 11830714 A | 10/2020 |
| CN | 212460199 U | 2/2021 |
| WO | 2016105521 A1 | 6/2016 |
| WO | 2018196968 A1 | 11/2018 |

OTHER PUBLICATIONS

The Extended European Search Report received in the corresponding European Application 21845585.5, dated Oct. 23, 2023.

* cited by examiner

IMAGE DISPLAY CONTROL METHOD, IMAGE DISPLAY CONTROL APPARATUS, AND HEAD-MOUNTED DISPLAY DEVICE

CROSS REFERENCE TO RELATED APPLICATIONS

The present application is a national phase entry under 35 U.S.C. § 371 of International Application PCT/CN2021/107811, filed Jul. 22, 2021, entitled "IMAGE DISPLAY CONTROL METHOD, IMAGE DISPLAY CONTROL APPARATUS, AND HEAD-MOUNTED DISPLAY DEVICE," which claims the benefit of and priority to Chinese Patent Application No. 202010721991.8, filed Jul. 24, 2020, entitled "IMAGE DISPLAY CONTROL METHOD, IMAGE DISPLAY CONTROL DEVICE AND HEAD-MOUNTED DISPLAY EQUIPMENT," both of which are hereby incorporated by reference in their entireties for all purposes.

TECHNICAL FIELD

Embodiments of the present description relate to the field of computer vision, and specifically relate to an image display control method, an image display control apparatus, and a head-mounted display device.

BACKGROUND

Virtual reality technology is a computer simulation technology that can be used to create and experience a virtual world. It uses data in real life and combines it with various output devices by electronic signals generated by computer technology, to transform it into phenomena that can be perceived by people, thereby simulating a world in reality by computer technology such that users are immersed in the environment.

Virtual reality technology is recognized by more and more people. Users can experience the most real perceptions in a virtual reality world, in which a simulated environment is indistinguishable from the real world, such that people feel like being personally on the scene. In addition, virtual reality technology can truly achieve human-computer interaction, such that people can operate at will and get the most real feedback from the environment in the process of operation. The existential, multi-perceptual, interactive and other characteristics of virtual reality technology have made virtual reality technology popular with many people.

In virtual reality display, a wearer of a head-mounted display device expects that when he is viewing virtual scene images, depth positions of the virtual images can be dynamically adjusted according to depth changes of virtual scene depth planes being viewed, to achieve dynamic depth display of the virtual images. Currently, there is still no better solution to the above problem in the art.

SUMMARY

In view of the above problem, embodiments of the present description provide an image display control method for a head-mounted display device, an image display control apparatus, and a head-mounted display device. Using this method and apparatus, a displacement sequence of a displacement apparatus and a source image display sequence of an image source apparatus are determined based on a virtual scene display depth range, and the image source apparatus is cyclically moved to target positions according to the displacement sequence, and a corresponding source image is projected when the image source apparatus reaches each target position, thereby achieving dynamic display of virtual images on virtual scene depth planes.

According to an aspect of embodiments of the present description, there is provided an image display control method for a head-mounted display device. The head-mounted display device includes an optical imaging apparatus, an image source apparatus, a displacement apparatus and an image display control apparatus. The image source apparatus is optically aligned with the optical imaging apparatus and have a plurality of source images. Each source image has a different virtual scene display depth. The method is performed by the image display control apparatus. The image display control method includes: determining a displacement sequence of the displacement apparatus and a source image display sequence of the image source apparatus based on a virtual scene display depth range, each displacement in the displacement sequence corresponding to one source image in the source image display sequence and to one virtual scene display depth in the virtual scene display depth range; controlling the displacement apparatus to move, according to the displacement sequence, the image source apparatus to corresponding target positions; and after the image source apparatus reaches each of the target positions, controlling, according to the source image display sequence, the image source apparatus to perform source image projection, so as to display a clear virtual image of a source image, corresponding to the target position, in the source image display sequence.

BRIEF DESCRIPTION OF THE DRAWINGS

Further understanding of the essence and advantages of the contents of embodiments of the present description can be achieved by referring to the accompanying drawings below. In the accompanying drawings, similar components or features may have the same reference signs. The accompanying drawings are used to provide further understanding of the embodiments of the present invention and form part of the specification, and are used, together with the following detailed description of the embodiments, for explaining the embodiments of the present description, but do not limit the embodiments of the present description. In the drawings.

DETAILED DESCRIPTION

The subjects described herein will be discussed below with reference to exemplary implementations. It should be understood that these implementations are discussed just to enable those skilled in the art to better understand and implement the subjects described herein, and are not intended to limit the scope of protection, applicability or examples set forth in the claims. Functions and arrangements of elements discussed can be changed without departing from the scope of protection of the embodiments of the description. In the examples, various processes or components can be omitted, substituted or added, as needed. Furthermore, features described with respect to some examples can also be combined in other examples.

As used herein, the term "include" and its variants denote open-ended terms, meaning "including but not limited to". The term "based on" means "at least partially based on". The terms "one embodiment" and "an embodiment" denote "at least one embodiment". The term "another embodiment" denotes "at least one other embodiment". The terms "first", "second" and the like may refer to different or same objects. Other definitions can be included below, whether explicitly or implicitly. The definition of a term is consistent throughout the description unless explicitly indicated in the context.

The term "head-mounted display device" may denote that source images on an ultra-micro display screen are amplified by an optical imaging system (mainly various precision optical lenses) to project images onto the retina, thereby presenting large-screen virtual images in the eyes of a viewer.

Stereo-vision technology is a key technology in virtual reality technology, and aims to reconstruct three-dimensional geometric information of a scene according to two-dimensional shape information. With continuous development of science and technology, stereo-vision technology has also developed by leaps and bounds, and been widely used in people's daily life and work.

Figure 1:
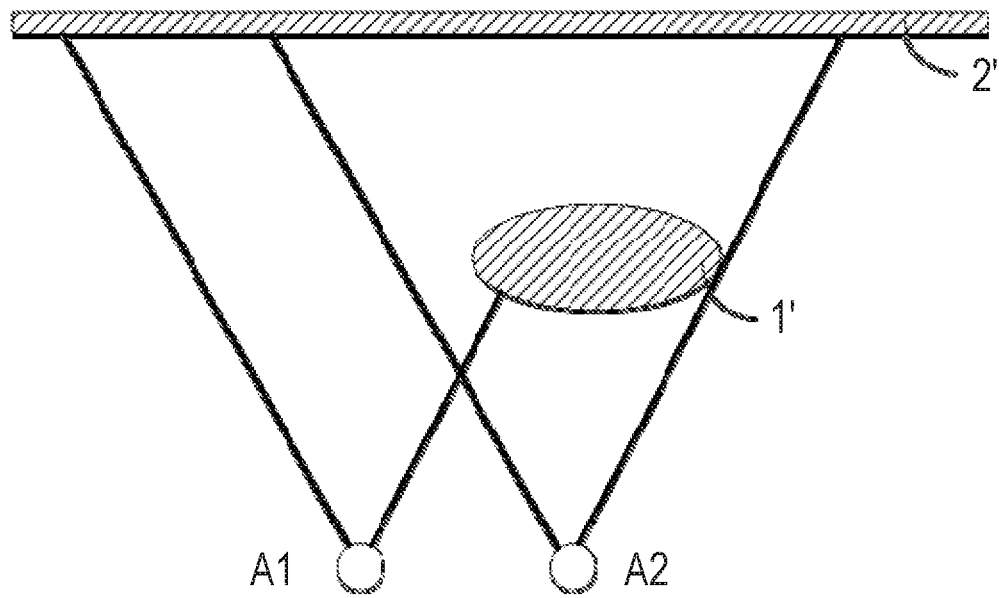
FIG. 1 shows an implementation schematic diagram of stereo-vision technology.

FIG. 1 shows an implementation schematic diagram of stereo-vision technology. As shown in FIG. 1, first, a target scene including a foreground target 1' and a background target 2' is photographed by a main camera A1 and an auxiliary camera A2, respectively, to acquire images of the target scene. The two types of target scene images are displayed as a combination of a left-eye image and a right-eye image, thereby generating parallax between the two eyes of the viewer and enabling the viewer to obtain a three-dimensional visual perception by three-dimensional display.

Although stereo-vision images can be more expressive than planar images, a point of intersection of sight lines of the two eyes of the viewer can not coincide with a focus point of the viewer, resulting in that the problem of vergence-accommodation conflict (VAC) is liable to occur, such that the viewer is prone to visual fatigue when viewing the virtual image scene in which the above stereo-vision technology is applied.

FIG. 2 shows an exemplary structural diagram of a head-mounted display device 200 according to an embodiment of the present description.

As shown in FIG. 2, the head-mounted display device 200 includes an optical imaging apparatus 210, a displacement apparatus 220, an image source apparatus 230 and an image display control apparatus 240.

The optical imaging apparatus 210 includes a beam-splitting element 213 and a reflective element 211. Source image light (represented by a solid line in the figure) emitted by the image source apparatus 230 is amplified by the beam-splitting element 213 and the reflective element 211 and then reaches a human eye position E, such that a virtual image can be seen at the point of the human eye position E.

Optionally, the beam-splitting element 213 and the reflective element 211 in the optical imaging apparatus 210 are see-through, such that a virtual image scene can be seen at the same time when an external real scene is seen, and the virtual image is superimposed on the real scene to achieve an augmented reality (AR) display function. In this case, the head-mounted display device 200 can be an AR device.

It is to be noted that the elements in the optical imaging apparatus 210 can also be adjusted to achieve different display functions. For example, the reflective element 211 is adjusted to a non-see-through optical component such that the head-mounted display device 200 can achieve a virtual reality (VR) display function. In this case, the head-mounted display device 200 can be a VR device.

In addition, in embodiments of the present description, the structure of the optical imaging apparatus 210 is not limited to the example shown in FIG. 2, but can also be implemented by using other suitable structures known in the art. For example, the optical imaging apparatus 210 can adopt a free-form curved surface prism structure, or the like.

Figure 2A:
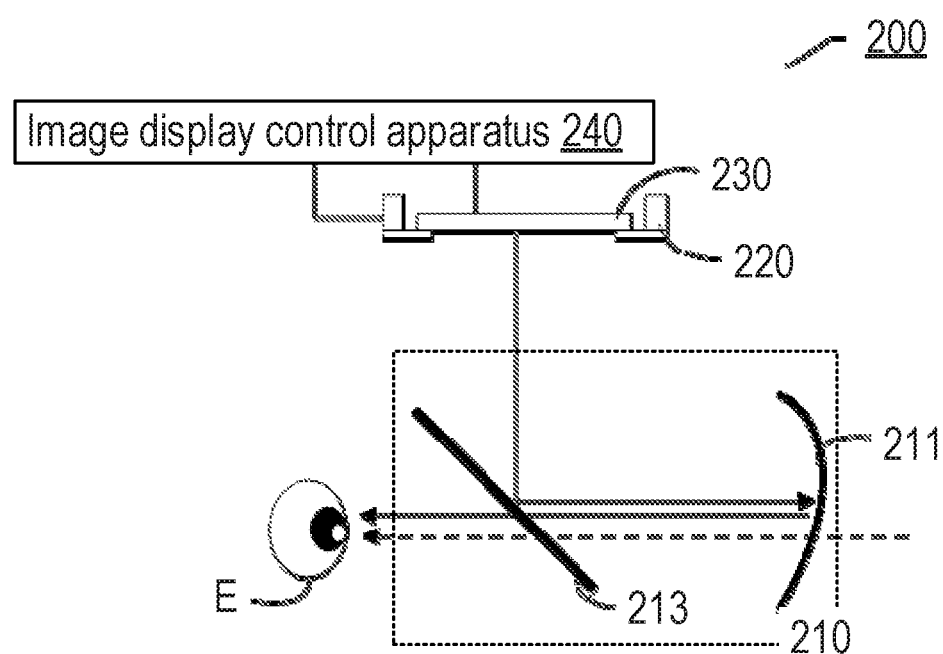
FIGS. 2A to 2E show exemplary structural diagrams of a head-mounted display device according to embodiments of the present description.
Figure 2B:
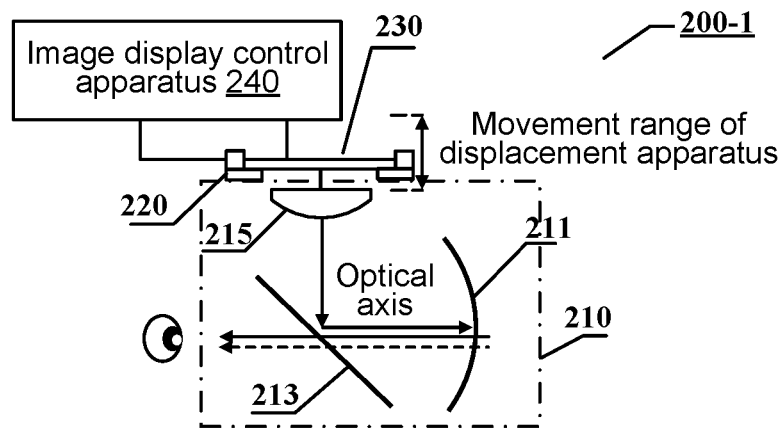
Figure 2C:
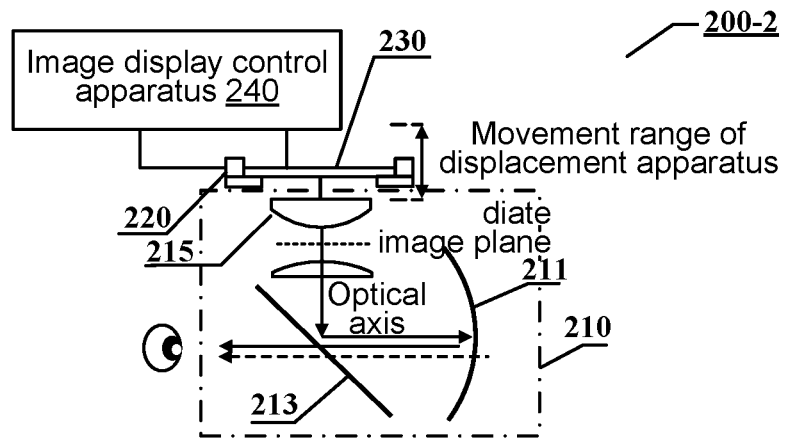

In an example of the present description, the optical imaging apparatus 210 can also have more optical elements or a more complex optical structure. Exemplarily, the optical imaging apparatus 210 can also include at least one aberration compensation element to achieve aberration compensation, such as spherical aberration, chromatic aberration, astigmatism, distortion, and other aberration compensation, of the optical imaging apparatus. For example, the aberration compensation element can be implemented by using a single lens or a lens set. FIG. 2B shows an implementation example of an optical imaging apparatus having a single lens 215, and FIG. 2C shows an implementation example of an optical imaging apparatus having a lens set 215.

Figure 2D:
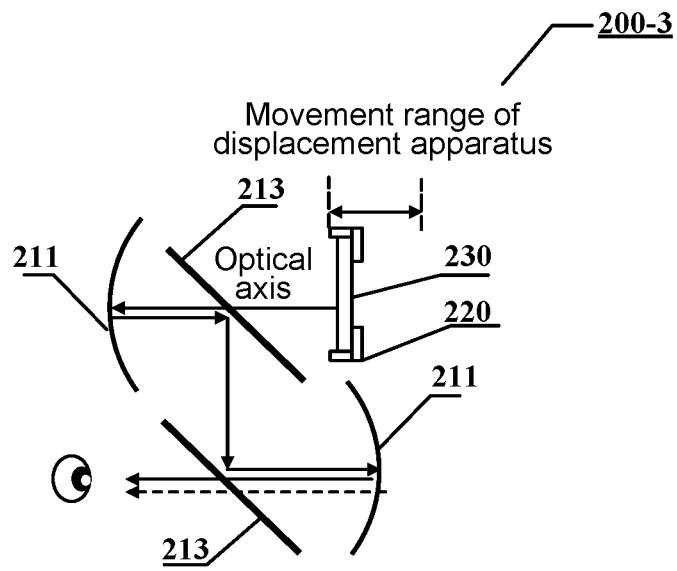
Figure 2E:
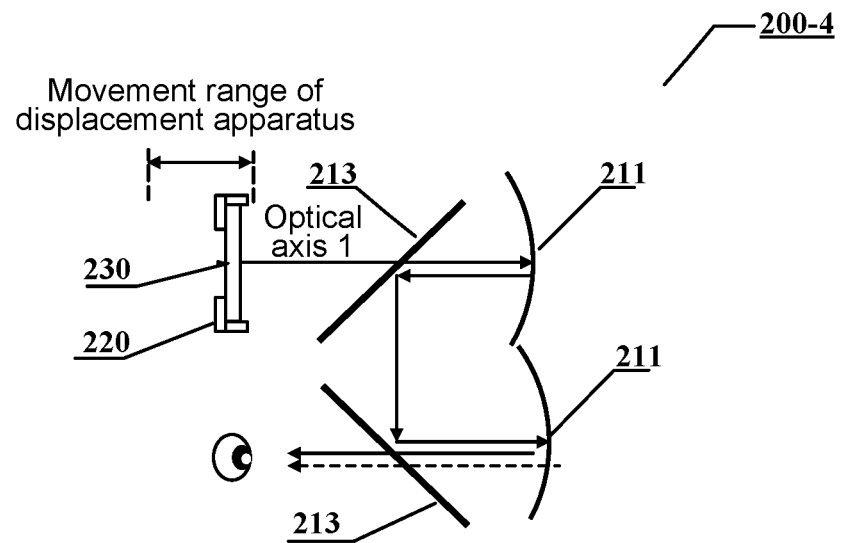

In another example, the optical imaging apparatus 210 can include a reflective optical structure, as shown in FIGS. 2D and 2E. The light emitted by the image source apparatus 230 enters human eyes after the action of two sets of beam-splitting elements 213 and reflective elements 211. The plurality of reflective elements increase the degrees of freedom of the system for correcting system aberration, so there is no chromatic aberration.

The image source apparatus 230 includes a plurality of source images. The plurality of source images are in the same virtual scene, and each source image has a predetermined virtual scene display depth (which may also be referred to as a virtual image display depth). In other words, the source image is pre-processed to be clearly displayed on a predetermined virtual scene display depth plane. The image source apparatus 230 is configured to be optically aligned with the optical imaging apparatus 210 so that the light emitted by the image source apparatus 230 can pass through the optical imaging apparatus 210 to achieve normal optical imaging. The image source apparatus 230 can be arranged on the displacement apparatus 220 and move integrally with the displacement apparatus 220. For example, the image source apparatus 230 can be bound to the displacement apparatus 220, for example by bonding, clamping or the like, so that when the displacement apparatus 220 moves, it can cause the image source apparatus 230 to move.

Figure 3:
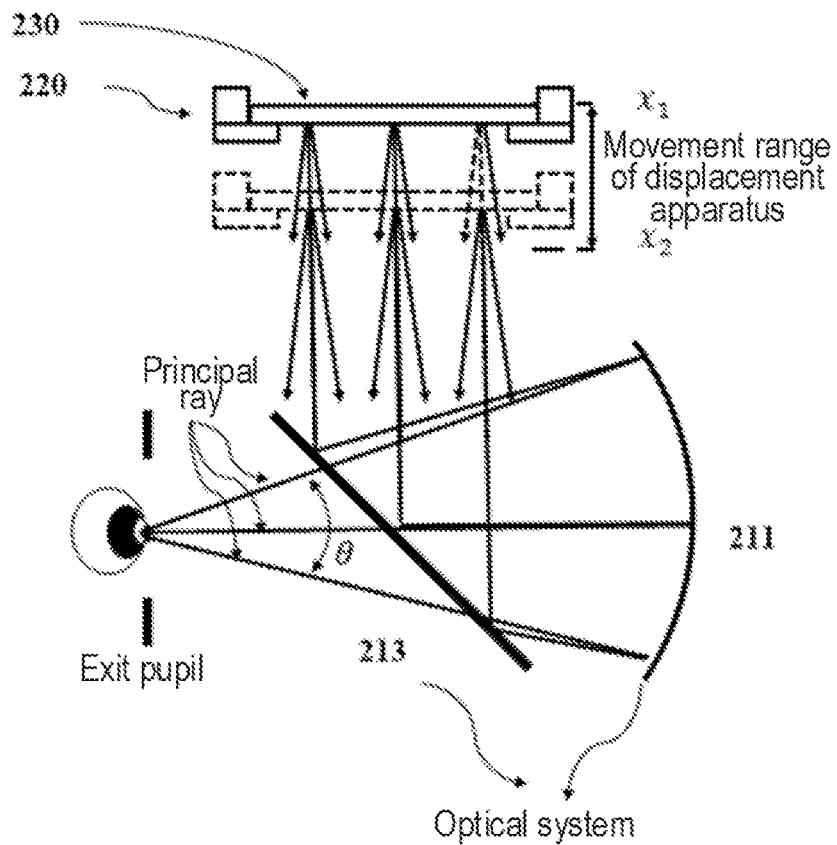
FIG. 3 shows an example schematic diagram of an optical imaging apparatus and an image source apparatus configured as an object-side telecentric optical path.
Figure 4:
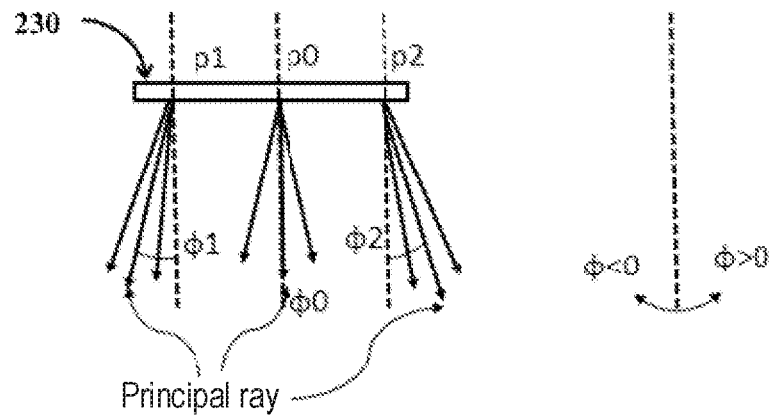
FIG. 4 shows a schematic diagram of variations of an angle of field with an incident angle of a pixel.

In an example of the present description, the optical imaging apparatus 210 and the image source apparatus 230 can be configured as an object-side telecentric optical path to have an ideal or approximately object-side telecentric optical architecture. FIG. 3 shows an example schematic diagram of an optical imaging apparatus 210 and an image source apparatus 230 configured as an object-side telecentric optical path, in which principal rays are rays that are formed by light emitted from pixels on the image source apparatus 230 and pass through the center of an exit pupil. An angle included between edge principal rays with respect to the human eyes is an angle of field θ. Assuming that an angle (angle of incidence) between the principal ray of each pixel (e.g., p0, p1, p2) and a normal line of the image source apparatus 230 is φ (e.g. φ0, φ1, φ2), using the normal line in FIG. 4 as a reference, the angle φ can take a positive or negative value, generally chosen from ±1°, ±5°, ±10°, ±20°, and ±30°. Within the movement range of the displacement apparatus, different angles φ will cause changes of the angle of field θ, as shown in FIG. 4. Optionally, the angle φ is 0 degree, i.e., perpendicular to the image source apparatus 230.

Figure 5:
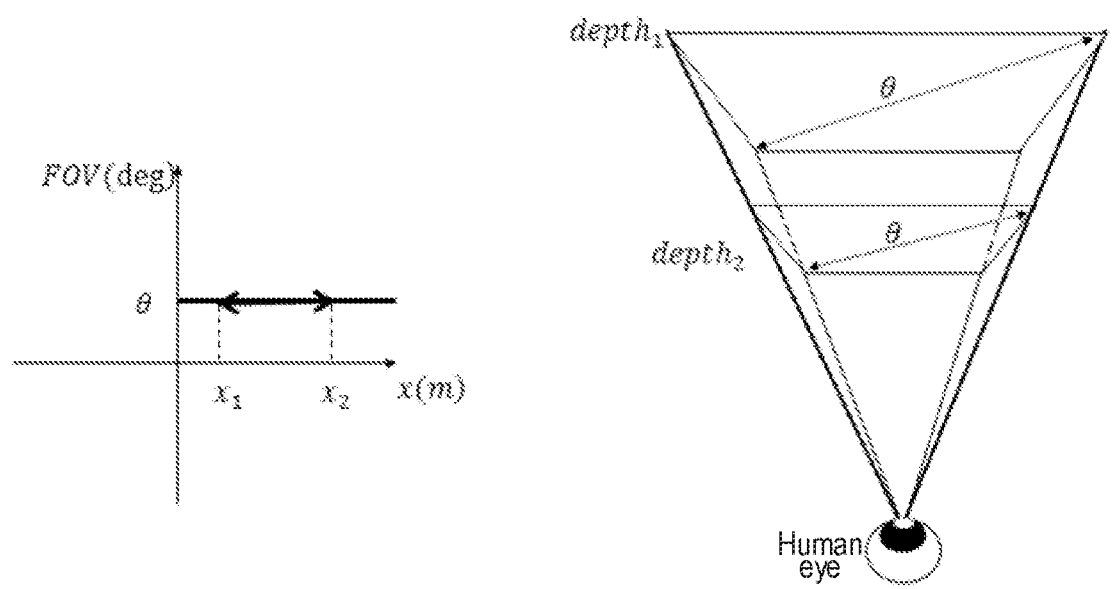
FIG. 5 shows a schematic diagram of variations of an angle of field when an incidence angle of a pixel is 0.

In the present description, an optional angle φ is 0°, i.e., perpendicular to the image source apparatus 230. Before and after the image source apparatus 230 is moved, the angle of each principal ray relative to the human eyes remains unchanged, as shown in the left view in FIG. 5. The value of θ does not change with the displacement distance, and the angle of field θ remains unchanged. That is to say, at different depths (depth1, depth2), a field angle of an image seen by the human eyes relative to the human eyes remains consistent, as shown in the right view in FIG. 5. The angle of field remaining consistent at different depths is better in line with observation habits of human eyes.

In the case where the optical imaging apparatus 210 and the image source apparatus 230 are configured as an object-side telecentric optical path, when the displacement apparatus 220 moves the image source apparatus 230, the angles of the principal rays of the pixels in the source image emitted by the image source apparatus 230 do not change almost, when the principal rays enter the pupil of the human eyes, so that the angle of field of the head-mounted display device can substantially remain constant when virtual images are at different display depths.

The image display control apparatus 240 is communicatively connected to the displacement apparatus 220 and the image source apparatus 230. The image display control apparatus 240 is configured to: determine a displacement sequence of the displacement apparatus 220 and a source image display sequence of the image source apparatus 230, based on a virtual scene display depth range; control the displacement apparatus 220 to move, according to the displacement sequence, the image source apparatus 230 to target positions; and after the image source apparatus 230 reaches each of the target positions, control, according to the source image display sequence, the image source apparatus 230 to perform source image projection, so as to display on a corresponding virtual scene display depth plane a clear virtual image of a source image, corresponding to the target position, in the source image display sequence. The structure and operation of the image display control apparatus 240 will be described in detail below with reference to the accompanying drawings.

It can be understood that the structure of the head-mounted display device 200 should be not limited to the examples in FIGS. 2A-2E, and can be configured in other ways. In an example of the present description, the head-mounted display device may be not provided with the displacement apparatus, and the image source apparatus has a displacement function. For example, the image source apparatus can receive a displacement instruction from the image display control apparatus and move according to displacement information indicated by the displacement instruction. In another example of the present description, the displacement apparatus has a displacement mechanism and an auxiliary mechanism, and only the displacement part is configured to move integrally with the image source apparatus.

Figure 6:
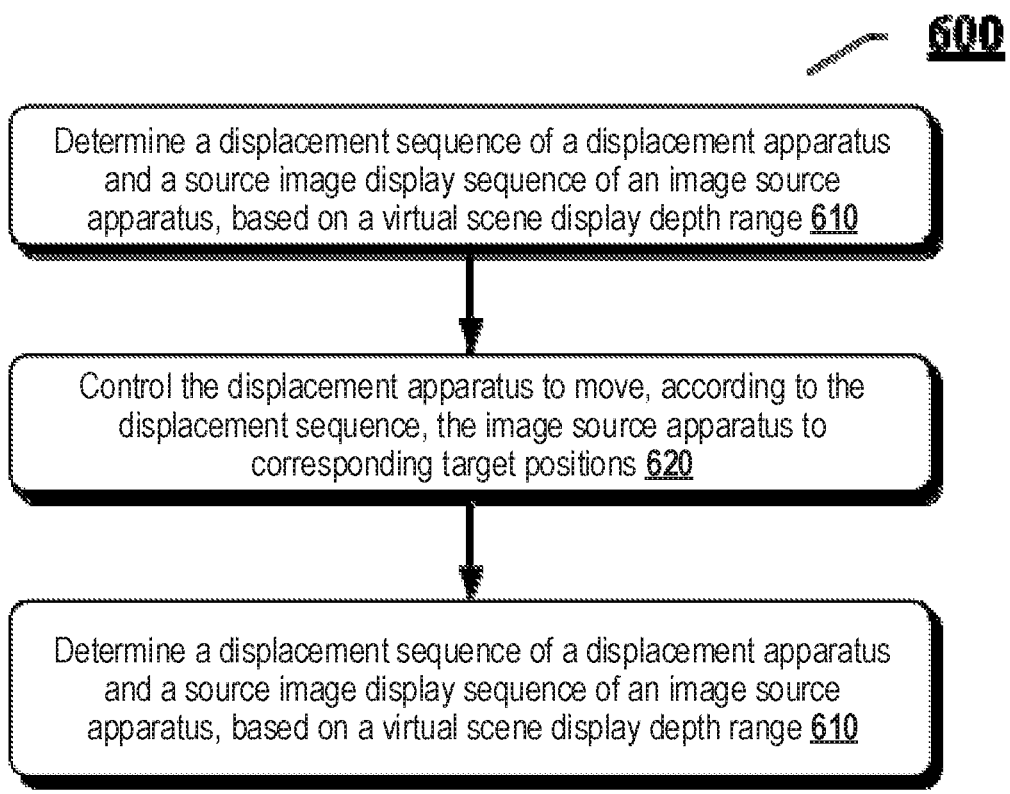
FIG. 6 shows a flow diagram of an image display control method for a head-mounted display device according to embodiments of the present description.

FIG. 6 shows a flow diagram of an image display control method 600 for a head-mounted display device according to embodiments of the present description.

As shown in FIG. 6, at block 610, an image display control apparatus 240 determines a displacement sequence of a displacement apparatus 220 and a source image display sequence of an image source apparatus 230, based on a virtual scene display depth range. Each displacement in the displacement sequence corresponds to one source image in the source image display sequence and to one virtual scene display depth in the virtual scene display depth range. For example, if the virtual scene display depth range includes a plurality of virtual scene display depths {Depth1, Depth2, . . . , DepthN}, then based on each virtual scene display depth, a corresponding displacement and a source image with the virtual scene display depth can be determined. Here, the displacement can denote a distance that the displacement apparatus needs to move when changing from one virtual scene display depth to another virtual scene display depth. The determined displacements are sequentially formed into a displacement sequence {$x_1, x_2, \ldots, x_n$}, and the determined source images are sequentially formed into a source image display sequence {source image a, source image b, . . . , source image n}, wherein each displacement in the displacement sequence corresponds to one source image in the source image display sequence. For example, in an example, each displacement in the displacement sequence corresponds sequentially to one source image in the source image display sequence, i.e., a displacement and a source image with the same number in the sequences correspond to each other.

There is a depth displacement relationship between a virtual image display depth and a displacement of the displacement apparatus, and displacements corresponding to different virtual scene display depths can be determined according to the depth displacement relationship. Specifically, the depth displacement relationship can be determined based on the Newtonian formula for an object-image relationship or the Gaussian formula for an object-image relationship.

The Gaussian formula for an object-image relationship is specifically described as follows:

$$\frac{f'}{l'} + \frac{f}{l} = 1$$

where f and f' are an object-side focal length and an image-side focal length, respectively, and l and l' are the distance from an image source to a principal point of the optical imaging apparatus, and the distance from a virtual image formed thereby to the principal point of the optical imaging apparatus, respectively.

The Newtonian formula for an object-image relationship is specifically described as follows:

$$ff' = xx'$$

where f and f' are an object-side focal length and an image-side focal length, respectively, and x and x' are the distance from the image source apparatus to an object-side focus of the optical imaging apparatus, and the distance from a virtual image formed thereby to an image-side focus of the optical imaging apparatus, respectively. The distance x from the image source apparatus to the object-side focus of the optical imaging apparatus can be achieved by a displacement of the displacement apparatus.

Here, either the Newtonian formula for an object-image relationship or the Gaussian formula for an object-image relationship can be used to determine the above depth displacement relationship. In the Newtonian formula, a reciprocal of x' is a viewing degree at the position of a depth plane where a current virtual image is located, and is denoted by a variable depth. Accordingly, the depth displacement relationship can be described as:

$$\text{depth} = \frac{x}{ff'}$$

Thus, the virtual image display depth can be changed by changing the distance from the image source apparatus to the optical imaging apparatus.

Figure 7:
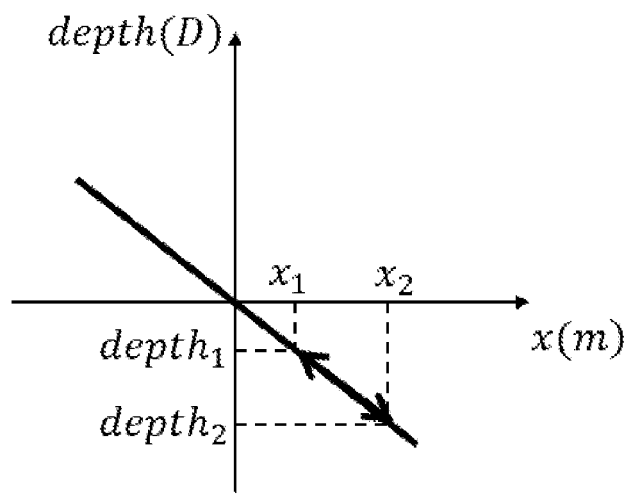
FIG. 7 shows an example schematic diagram of a depth displacement relationship between a virtual image depth and a distance from an image source apparatus to an object-side focus of an optical imaging apparatus, according to embodiments of the present description.

FIG. 7 shows an example schematic diagram of a depth displacement relationship between a virtual image display depth and a distance from an image source apparatus to an object-side focus of an optical imaging apparatus, according to embodiments of the present description. As shown in FIG. 7, by moving the displacement apparatus, x can be adjusted within a displacement range between $x_1$ and $x_2$, and accordingly, virtual image display depth information can be changed between depth1 and depth2, and the depth and the displacement are in a linear relationship.

Returning to FIG. 6, after the displacement sequence of the displacement apparatus 220 is obtained as described above, at block 620, the image display control apparatus 240 controls the displacement apparatus 220 to move, according to the displacement sequence, the image source apparatus 230 to corresponding target positions. For example, in the case where the displacement sequence is {$x_1, x_2, \ldots, x_n$}, the displacement apparatus 220 can first move a displacement x1 to arrive at a first target position corresponding to a first virtual scene display depth. Next, it moves a displacement x2 to arrive at a second target position corresponding to a second virtual scene display depth. Proceeding in this order, it finally arrives at a last virtual scene display depth. In an example of the present description, the image display control apparatus 240 can control the displacement apparatus 220 to move sequentially, according to the displacement sequence, the image source apparatus 230 to the corresponding target positions. In this case, after the image source apparatus 230 is moved to the target position corresponding to the last virtual scene display depth, the displacement apparatus 220 can return to the initial position or the displacement apparatus 220 can move sequentially the image source apparatus 230 in reverse order.

In the present description, the image source apparatus 230 is arranged on an optical axis of the optical imaging apparatus 210, and moves in the direction of the optical axis during the movement of the image source apparatus (or the displacement apparatus 220), to guarantee the imaging quality of virtual images.

After the image source apparatus 230 reaches each of the target positions, at block 630, the image display control apparatus 240 controls, according to the source image display sequence, the image source apparatus 230 to perform source image projection, so as to display a clear virtual image of a source image, corresponding to the target position, in the source image display sequence.

In an example of the present description, the virtual scene display depth range can be generated based on a human eye gaze depth sequence of a user of the head-mounted display device. In this example, when the head-mounted display device is used, the human eyes sequentially gaze at corresponding virtual image display depth planes according to a predetermined gaze depth sequence and view virtual images on the corresponding virtual image display depth planes. In this example, the human eye gaze depth sequence sequentially corresponds to a virtual image display depth sequence.

In the present description, in some application scenarios, the human eye gaze depth sequence can be pre-acquired by a depth acquisition apparatus. Alternatively, in some application scenarios, the human eye gaze depth sequence can be acquired in real time by a depth acquisition apparatus. In this case, during working of the depth acquisition apparatus, a current human eye gaze depth is uninterruptedly tracked and acquired in real time, and a displacement is determined according to the current human eye gaze depth to move the image source apparatus to a corresponding target position and project a source image with a corresponding virtual scene display depth. Here, the human eye gaze depth sequence (depth 1, depth 2, depth 3, . . . , depth N) and the virtual scene display depth sequence (depth 1, depth 2, depth 3, . . . , depth N) are consistent, thereby accomplishing real-time dynamic depth display. How to acquire human eye gaze depths by the depth acquisition apparatus will be described in detail later in conjunction with the accompanying drawings.

Figure 8:
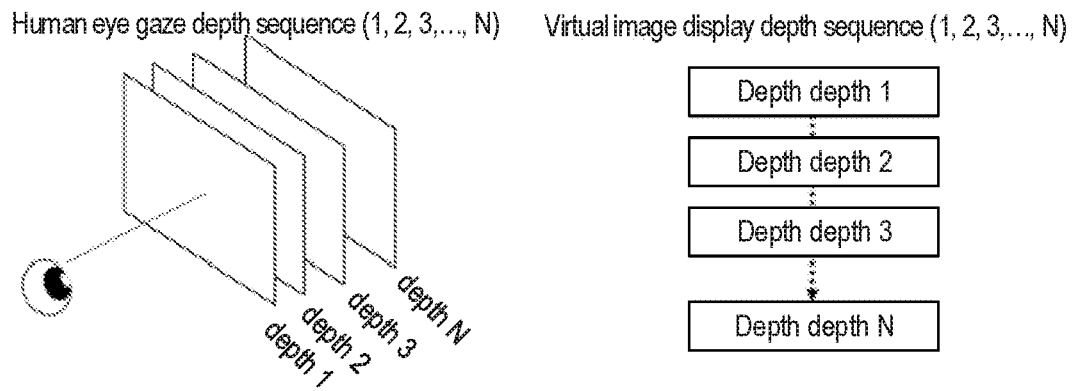
FIG. 8 shows a schematic diagram of a human eye gaze depth sequence and a virtual image display depth sequence according to embodiments of the present description.

FIG. 8 shows a schematic diagram of a human eye gaze depth sequence and a virtual image display depth sequence according to embodiments of the present description. As shown in FIG. 8, the human eye gaze depth sequence is {depth1, depth2, depth3, . . . , depthN}, and the virtual image display depth sequence is {depth1, depth2, depth3, . . . , depthN}. Here, the human eye gaze depths depth1 to depthN correspond to the virtual image display depths depth1 to depthN, respectively.

In this case, after the image source apparatus 230 reaches each of the target positions, the image display control apparatus 240 controls the image source apparatus 230 to select a source image, corresponding to the target position, from the source image display sequence. Then, the image display control apparatus 240 controls the image source apparatus 230 to project the selected source image to display a corresponding clear virtual image.

Figure 9:
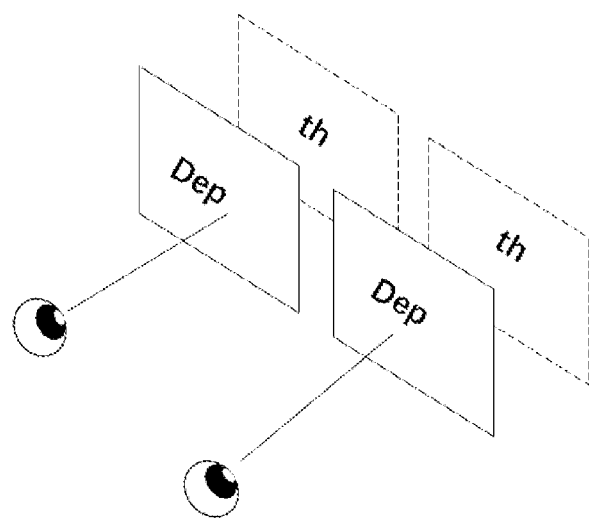
FIG. 9 shows an effect schematic diagram of an example of virtual image display according to embodiments of the present description.

FIG. 9 shows an effect schematic diagram of an example of virtual image display according to embodiments of the present description.

As shown in FIG. 9, virtual images corresponding to a virtual scene "Depth" include a virtual image of a source image "Dep" and a virtual image of a source image "th". The source image "Dep" and the source image "th" have different virtual scene display depths, i.e., the virtual image of the source image "Dep" and the virtual image of the source image "th" are configured as virtual images at different virtual scene display depths. In FIG. 9, when the human eyes gaze at a virtual scene display depth plane corresponding to the source image "Dep", the virtual image of the source image "Dep" is displayed on the virtual scene display depth plane, without displaying the virtual image of the source image "th". When the human eyes gaze at a virtual scene display depth plane corresponding to the source image "th", the virtual image of the source image "th" is displayed on the virtual scene display depth plane, without displaying the virtual image of the source image "Dep".

As described above, movement of one displacement only achieves display of one or more virtual images for a single depth. In an example of the present description, in order to display a virtual scene with a depth parallax effect (or multi-depth visual effect), the principle of "persistence of vision" can be used, and the displacement apparatus can be rapidly moved and virtual images with different depth information can be correspondingly rapidly updated for display, thereby achieving the depth parallax effect. For example, the displacement apparatus can be rapidly moved so that a time interval of the displacement apparatus moving from any target position to another target position is less than or equal to a duration of vision of the human eyes. In conjunction with the example in FIG. 9, when the virtual image corresponding to the source image "th" is displayed, the virtual image corresponding to the source image "Dep" displayed previously still stays visually in the human eyes (the duration of vision of the human eyes is generally 0.1-0.4 second), and thus a virtual image display result of "Depth" can be obtained in the human eyes. It can be understood that the above-mentioned time of the displacement apparatus moving from any target position to another target position is controlled to be less than or equal to the duration of vision of the human eyes, thereby achieving rapid movement of the displacement apparatus, so that there is still persistence of vision in the human eyes. In this case, when the image source apparatus displays a virtual image corresponding to a source image at another target position described above, a virtual image corresponding to a source image previously displayed at one target position described above still stays visually in the human eyes, thus enabling rapid updating of the virtual images with different depth information. The one target position and another target position described above may be adjacent target positions reached by the displacement apparatus as it moves according to the displacements in the displacement sequence. Alternatively, the one target position and another target position described above may also be two different positions that can be reached by the displacement apparatus during movement of one displacement.

In another example of the present description, the virtual scene display depth range can be determined according to a human eye gaze depth range of the user using the head-mounted display device, or can be determined according to a movable range of the image source apparatus. In this case, the virtual scene display depth range can be independent of an actual gaze depth of the human eyes.

Figure 10:
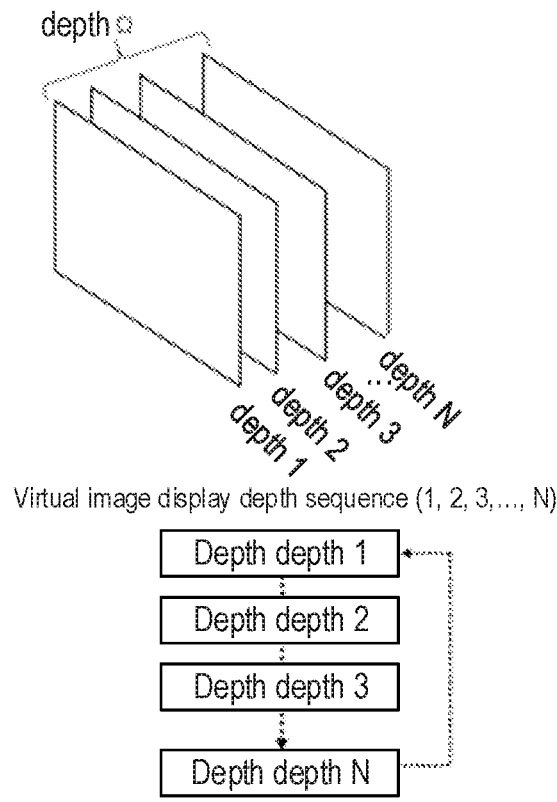
FIG. 10 shows a schematic diagram of a virtual scene display depth range and a virtual image display depth sequence according to embodiments of the present description.

FIG. 10 shows a schematic diagram of a virtual scene display depth range and a virtual image display depth sequence according to embodiments of the present description.

In an example, after the image source apparatus 230 reaches each of the target positions, the image display control apparatus 240 controls the image source apparatus 230 to perform image blurring on a first source image set. The first source image set can be obtained by removing a source image in the source image display sequence from a source image set that the image source apparatus 230 has, in which the removed source image corresponds to the target position. For example, assuming that the source image set that the image source apparatus has includes source images (an image a to an image f), and that the source image, corresponding to the target position, in the source image display sequence is the source image b, the first source image set includes the source image a as well as the source images c to f. Then, the image display control apparatus 240 controls the image source apparatus to project the blurred source image set to display a clear virtual image of the source image, corresponding to the target position, in the source image display sequence. It is to be noted that the above processing is performed each time the image source apparatus is moved to a target position and performs source image projection.

Figure 11:
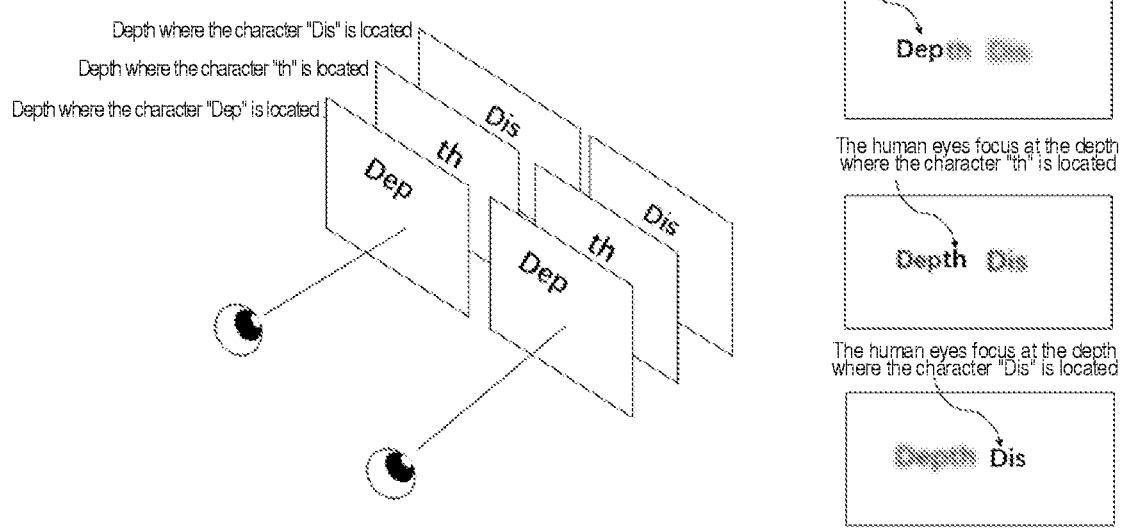
FIG. 11 shows an effect schematic diagram of another example of virtual image display according to embodiments of the present description.

FIG. 11 shows a schematic diagram of a virtual image effect in the above example. As shown in FIG. 11, for a single virtual scene display depth plane, only a virtual image of a single source image is displayed clearly, while virtual images of other source images are displayed fuzzily, such that a virtual scene "Depth Display" with a parallax effect can be displayed.

In the present description, various image blurring technologies can be used to perform blurring. For example, low-pass filtering smoothing can be performed to render images to obtain out-of-focus source images with an out-of-focus display effect.

Figure 12:
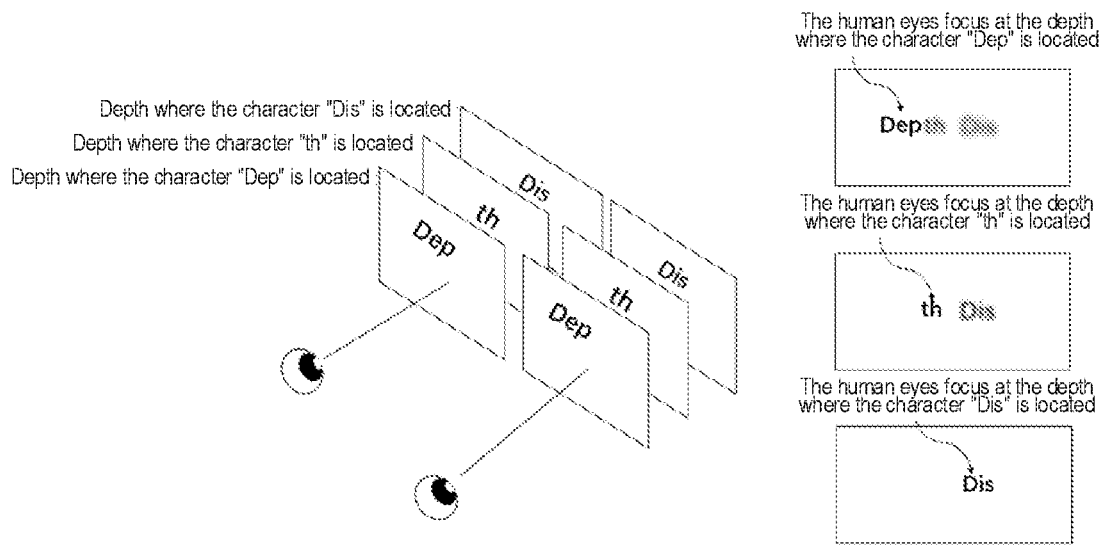
FIG. 12 shows an effect schematic diagram of yet another example of virtual image display according to embodiments of the present description.

In addition, in another example, the first source image set can be obtained by removing, some or all of previously projected source images, from a source image set that the image source apparatus 230 has, and removing, the source image, corresponding to the target position, in the source image display sequence, from a source image set that the image source apparatus 230 has. For example, assuming that the source image set that the image source apparatus 230 has includes source images (an image a to an image f), and that the source image, corresponding to the target position, in the source image display sequence is the source image d, the previously projected source images include source images a to c, and thus the first source image set can include the source images e to f (all of the previously projected source images are removed), or the first source image set can include the source images a to b and e to f (some of the previously projected source images are removed). Then, the image display control apparatus 240 controls the image source apparatus 230 to project the blurred source image set to display a clear virtual image of the source image, corresponding to the target position, in the source image display sequence. Also, the above processing is performed each time the image source apparatus is moved to a target position and performs source image projection. FIG. 12 shows a schematic diagram of a virtual image display effect in the above example.

Figure 13:
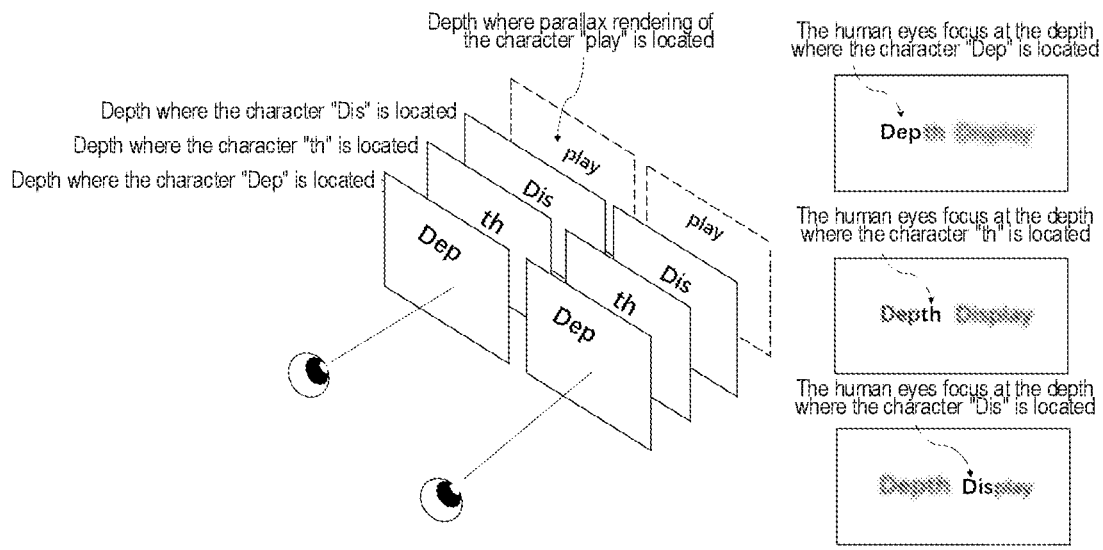
FIG. 13 shows an effect schematic diagram of still another example of virtual image display according to embodiments of the present description.

In addition, in another example, if a cyclic movement period of the image source apparatus 230 is greater than the duration of vision of the human eyes, then at each time of source image projection, the image display control apparatus 240 controls the image source apparatus 230 to perform image blurring on a specified source image in the source image set provided therein, so that at each time of source image projection, the specified source image is not clearly displayed. In the present description, the specified source image can include one or more source images. FIG. 13 shows a schematic diagram of a virtual image display effect in this example. As shown in FIG. 13, the specified source image includes a source image "play", and at each time of source image projection, image blurring is performed on the source image "play".

In addition, in another example, if there are source images, whose virtual scene display depths are outside the virtual scene display depth range, in the source image set that the image source apparatus 230 has, image blurring is performed on these source images at each time of source image projection, so that at each time of source image projection, these images are not clearly displayed.

A process of acquiring human eye gaze depths by a depth acquisition apparatus will be described in detail below in conjunction with the accompanying drawings. In this case, the head-mounted display device 200 further includes a depth acquisition apparatus. Examples of the depth acquisition apparatus can include, but are not limited to, any of: a binocular depth sensor, a structured light depth sensor, a time-of-flight depth sensor, and a human eye tracking sensor. In the present description, the human eye tracking sensor can include at least one human eye tracking unit. Optionally, the human eye tracking sensor includes a first human eye tracking unit for tracking left eye movement and a second human eye tracking unit for tracking right eye movement. The positions of the first human eye tracking unit and the second human eye tracking unit are symmetrically arranged.

Figure 14:
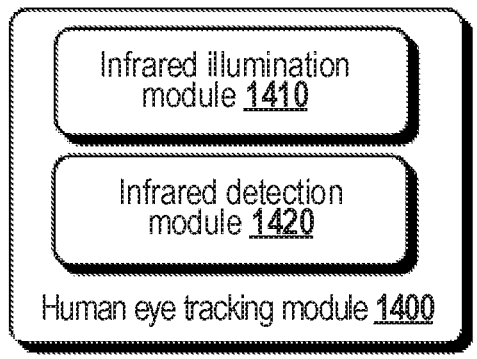
FIG. 14 shows an example block diagram of a human eye tracking unit according to embodiments of the present description.

FIG. 14 shows an example block diagram of a human eye tracking unit 1400 according to embodiments of the present description. As shown in FIG. 14, the human eye tracking unit 1400 includes an infrared illumination module 1410 and an infrared detection module 1420. The infrared illumination module 1410 is configured to emit infrared light to irradiate the human eyes. The infrared detection module 1120 is configured to receive an infrared image and analyze the infrared image to obtain current human eye gaze point information of the user, thereby obtaining a human eye gaze depth.

Figure 15:
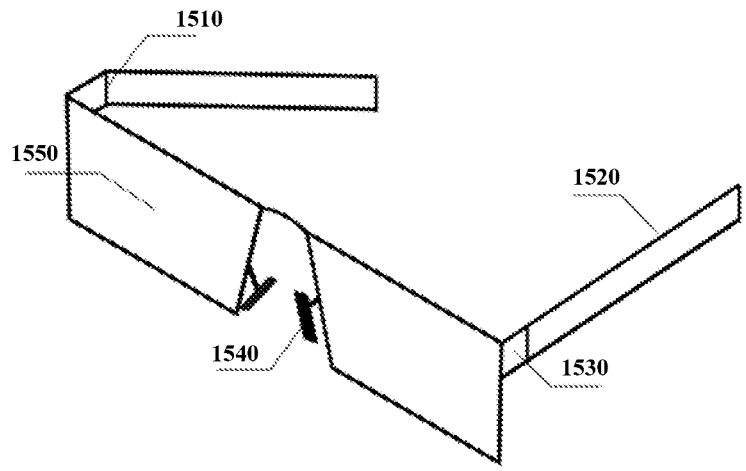
FIG. 15 shows an example schematic diagram of augmented reality display glasses according to embodiments of the present description.

FIG. 15 shows an example schematic diagram of augmented reality display (AR) glasses 1500 according to embodiments of the present description. The AR glasses 1500 can have a structural form of general sunglasses.

As shown in FIG. 15, the AR glasses 1500 include hinges 1510, arms 1520, end pieces 1530, nose pads 1540, and optical display system (i.e., optical imaging apparatus) 1550. The arms 1520 can be folded inward by means of the hinges 1510 at the end pieces 1530. The end pieces 1530 and the nose pads 1540 are usually located at edges of a field of view of the human eyes and are difficult to perceive. Therefore, the end pieces 1530 and the nose pads 1540 can be deemed as concealed components in the field of view.

In embodiments of the present description, the location where the infrared detection module is arranged can be appropriately limited to ensure a better infrared detection effect and component concealment effect. In an example of embodiments of the present description, the infrared detection module is arranged at a position outside a preset range of effective field of view.

Figure 16A:
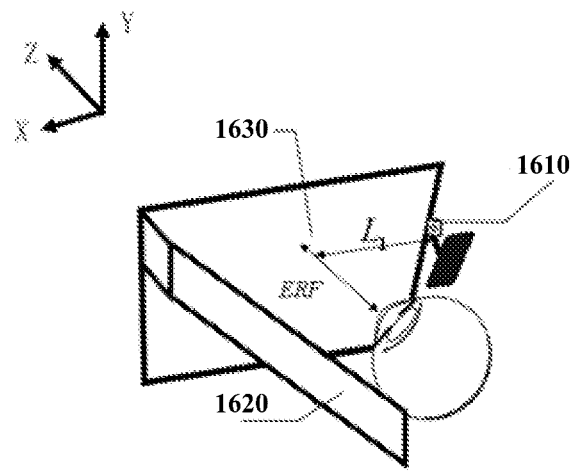
FIGS. 16A and 16B show schematic diagrams of arrangement of an infrared detection module in augmented reality display glasses according to embodiments of the present description.
Figure 16B:
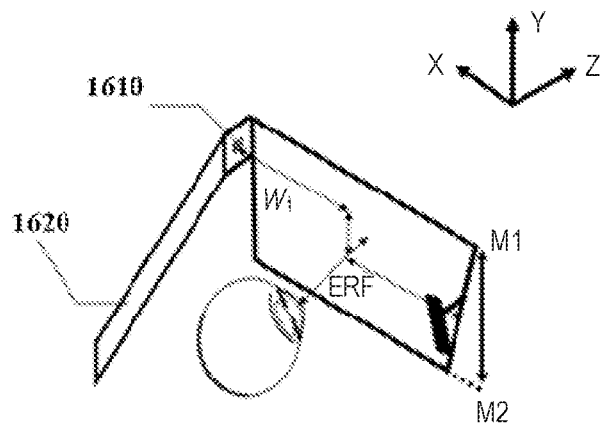

FIGS. 16A and 16B show schematic diagrams of the arrangement of the infrared detection module in the augmented reality display glasses according to embodiments of the present description.

As shown in FIG. 16A, the infrared detection module 1610 can be arranged on a side of the nose pad away from the nose bridge of the user. For example, two human eye tracking units can be arranged symmetrically on outer sides of corresponding left and right nose pads, respectively. As shown in FIG. 16B, the infrared detection module 1610 can be arranged at an inner wall of the end piece For example, two human eye tracking units can be arranged symmetrically on the inner walls of corresponding left and right end pieces, respectively. As the nose pads and the end pieces are usually located at edges of a field of view of the human eyes and are difficult to perceive; therefore, arranging the infrared detection module at the end piece and the nose pad can make them as concealed components in the field of view.

It is to be noted that the volume of the infrared detection module is generally within the scale of 5 mm, which is smaller than the volume of the nose pad or the end piece and can achieve greater concealment. The infrared detection module aims at the human eyes and is used to detect infrared light information reflected from the human eyes. As shown in FIG. 16A, in the case the infrared detection module is located on the nose side, a horizontal distance between the infrared detection module and a central optical axis is L1. As shown in FIG. 16B, in the case the infrared detection module is located at the end piece, a horizontal distance between the infrared detection module and the central optical axis is W1. In addition, the dimension of the optical display system in a direction Y is limited between M1 and M2. Preferably, the infrared detection module can also include an optical filter (e.g. CMOS, CCD, or the like), which can improve the detection quality of the infrared light information.

Figure 17:
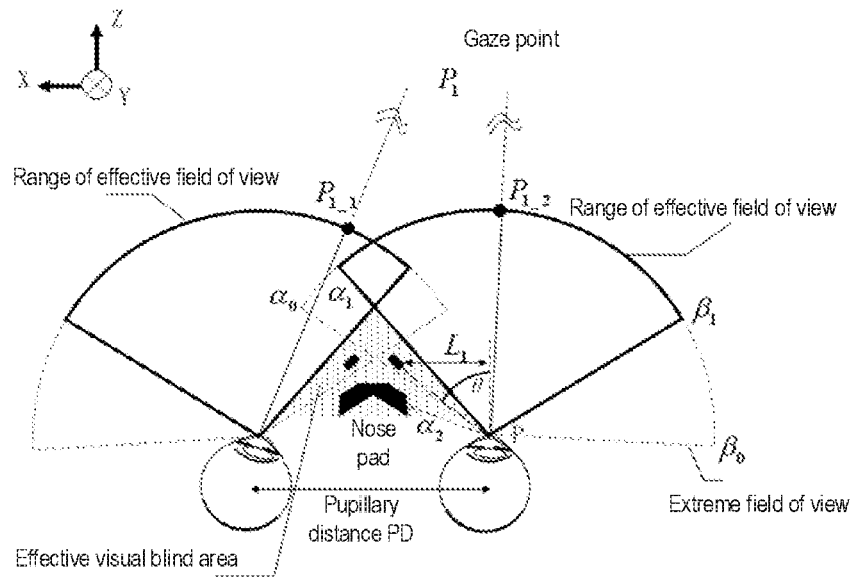
FIG. 17 shows a schematic diagram of parameter limitations for an infrared detection module located at a nose side according to embodiments of the present description.

FIG. 17 shows a schematic diagram of parameter limitations for an infrared detection module located at the nose side according to embodiments of the present description.

As shown in FIG. 17, two infrared detection modules are arranged symmetrically on the outer sides of the nose pads. A range of extreme field of view of each of two eyes is determined by a dashed box, i.e., by $\alpha_0$ and $\beta_0$, with $\alpha_0$ being approximately 62 degrees and $\beta_0$ being approximately 95 degrees.

Since the human eyes rarely observe extreme edges, a range of effective field of view is usually defined as a main activity range of the human eyes at ordinary times, and is determined by $\alpha_1$ and $\beta_1$. If $\alpha_1$ and $\beta_1$ are in the range of 10° to 20°, the human eyes can recognize text. If $\alpha_1$ and $\beta_1$ are about 30°, the human eyes can recognize letters. If $\alpha_1$ and $\beta_1$ are about 60°, the human eyes can recognize colors. In the present description, the range of effective field of view of AR display is determined by $\alpha_1$ and $\beta_1$, with $\alpha_1$ and $\beta_1$ ranging from 20° to 60°, preferably being 35°, 50°, or 60°. Areas beyond $\alpha_1$ and $\beta_1$ of the two eyes are effective visual blind areas, and areas beyond $\alpha_0$ and $\beta_0$ of the two eyes are absolute visual blind areas.

On the circles of the range of effective field of view of the two eyes, any two points $P_{1\_1}$ and $P_{1\_2}$ are taken, and if the centers of pupils of the two eyes are connected to $P_{1\_1}$ and $P_{1\_2}$, respectively, with extension lines intersecting at $P_1$, then $P_1$ is a current gaze point of the human eyes, and connecting lines are called directions of gaze.

In order to track changes of the gaze point of the human eyes, the infrared detection module is located within an effective visual blind area. A connecting line between the nose pad and the center P of the pupil of the human eye is $\alpha_2$, which is generally about 75 degrees. PD is a pupillary distance between two eyes of the user, which is between 55 mm and 75 mm for an ordinary person, and $L_1$ is the distance between the infrared detection unit and the pupil of the human eye. In an XZ plane, the position of the infrared detection module needs to satisfy the following constraints:

$$\alpha_1 \leq \theta \leq \alpha_2, \text{ and}$$

$$L_1 \leq \frac{PD}{2}.$$

Preferably, θ is 50°, 65° or 75°, corresponding to the preferred value 35°, 50° or 60° of $\alpha_1$, respectively. A preferred value of L1 is:

$$L_1 = \frac{PD - 10}{2}.$$

Figure 18:
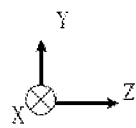
FIG. 18 shows a schematic diagram of parameter limitations for an infrared detection module in a direction Y according to embodiments of the present description.

FIG. 18 shows a schematic diagram of parameter limitations for an infrared detection module in a direction Y according to embodiments of the present description. As shown in FIG. 18, in a YZ plane, the dimension of an optical system in a direction Y are limited between M1 and M2, whose field angles with respect to the center P of the pupil of the human eye are $\alpha_3$ and $\alpha_4$, respectively. The mounting position of the infrared detection module only needs to be within the range of action of the optical system, so the mounting position of the infrared detection module needs to meet $\alpha_4 \leq \varphi \leq \alpha_3$, where $\alpha_3$ and as are within 40°, and φ is preferably 0.

Figure 19:
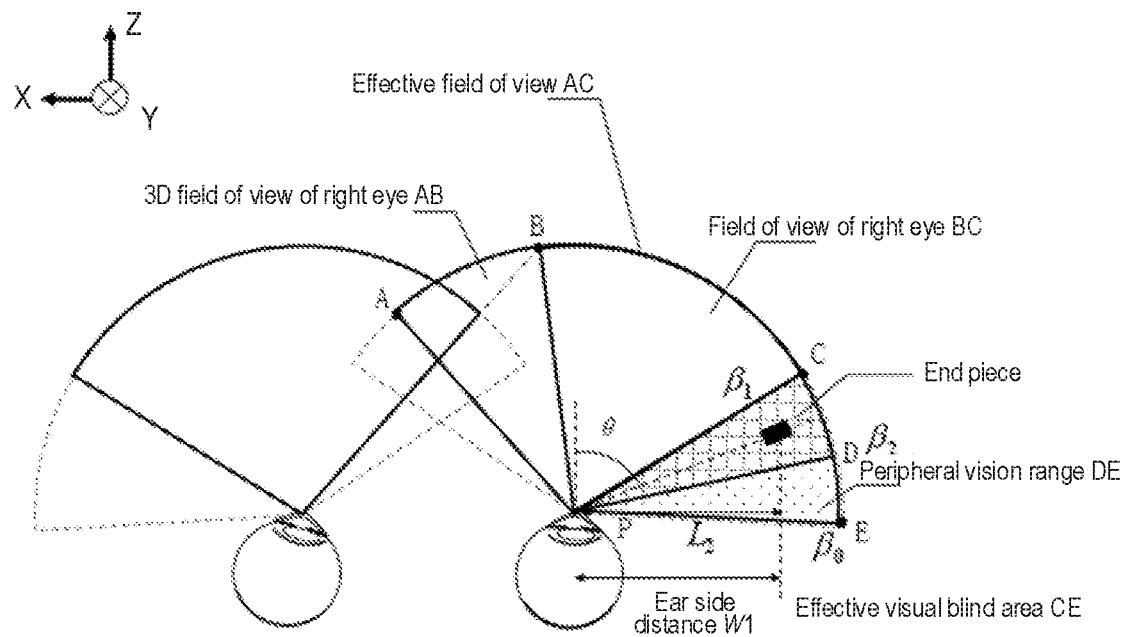
FIG. 19 shows a schematic diagram of parameter limitations for an infrared detection module located at an end piece according to embodiments of the present description.

FIG. 19 shows a schematic diagram of parameter limitations for an infrared detection module located at the end piece according to embodiments of the present description.

As shown in FIG. 19, the infrared detection module is arranged at the end piece. A visual field of $\alpha_1$ of the left eye intersects a range of effective field of view of the right eye at a point B, and the end piece is located within the range (the end piece is located therein) of points C and D in the visual field, their angles with respect to the pupil of the human eye being $\beta_1$ and $\beta_2$, respectively. The range from the point D to a point E is from a maximum field of view of the end piece with respect to the human eye to an extreme field of view $\beta_0$. In an XZ plane, the position of the infrared detection module needs to satisfy the following constraints:

$$\beta_1 \leq \theta \leq \beta_2,$$

$$L_2 = W_1.$$

Exemplarily, $\beta_1$ is between 20° and 60°, preferably 35°, 50° or 60°, and $\beta_2$ is between 80° and 95°. Preferably, the value of θ is 50°, 65° or 75°, corresponding to the value 35°, 50° or 60° of $\beta_1$, respectively. In the device design, the ear side distance W1 is usually between 30 mm and 55 mm, and is preferably 40 mm or 50 mm.

Figure 20:
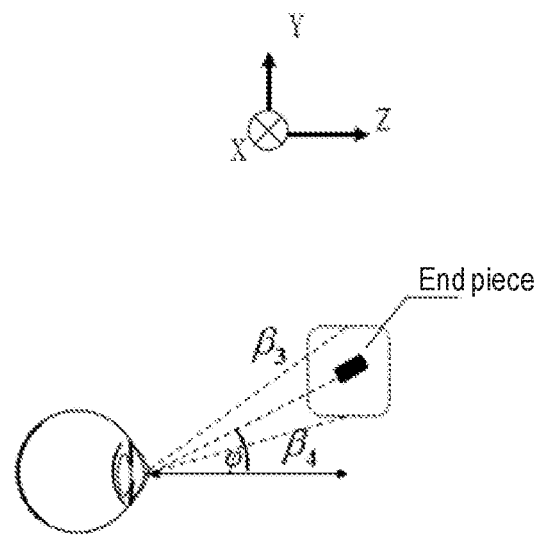
FIG. 20 shows a schematic diagram of parameter limitations for an infrared detection module in a direction Y according to embodiments of the present description.

FIG. 20 shows a schematic diagram of parameter limitations for an infrared detection module in a direction Y according to embodiments of the present description.

As shown in FIG. 20, in a YZ plane, field angles of the end piece in the direction Y with respect to the center P of the pupil of the human eye are $\beta_3$ and $\beta_4$, respectively. Thus, the position of the infrared detection module needs to meet $\beta_4 \leq \varphi \leq \beta_3$, β3 and β4 being within 60°. Preferably, the value of φ is 20°, 300 or 40°.

Figure 21:
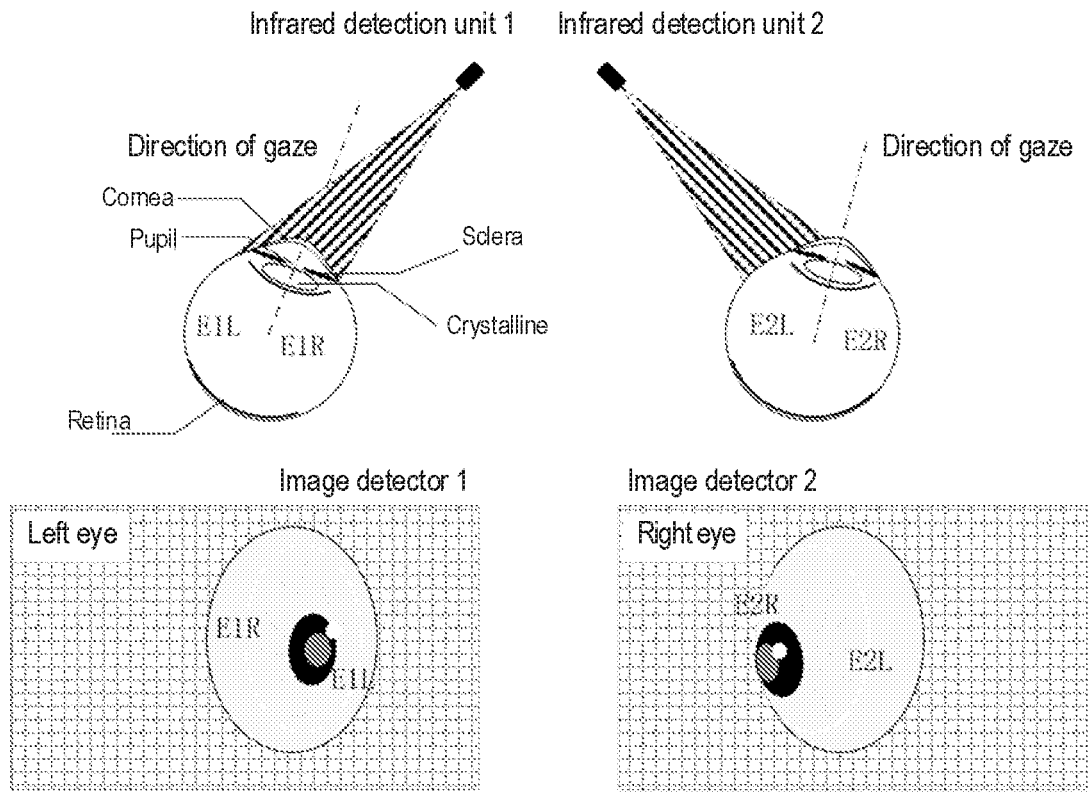
FIG. 21 shows a schematic diagram of acquisition of human eye information by infrared detection modules located at nose sides according to embodiments of the present description.

FIG. 21 shows a schematic diagram of acquisition of human eye information by infrared detection modules located at the nose sides according to embodiments of the present description.

As shown in FIG. 21, an infrared detection module 1 and an infrared detection module 2 are used to detect the left eye and the right eye, respectively, and detected left eye and right eye images are located on an image detector 1 of the infrared detection module 1 and an image detector 2 of the infrared detection module 2. Here, areas of the left eye located on the two sides of its direction of gaze are defined as E1L and E1R, and areas of the right eye located on the two sides of its direction of gaze are defined as E2L and E2R. In the direction of gaze shown in FIG. 21, the area E1L of the left eye is located more adjacent to an edge of a detection field of view of the infrared detection module than the area E1R, and an image of the area E1L is compressed and thus more information is lost therefrom than from an image of the area E1R. As shown in FIG. 21, the area E2R of the right eye is located more adjacent to an edge of a detection field of view of the infrared detection module 1 than the area E2L, and an image of the area E2R is compressed and thus more information is lost therefrom than from an image of the area E2L. When the two eyes are observing an object, there is a strong correlation between a focusing degree and the directions of gaze of the two eyes, and the structures of the two human eyes are similar, the information of E1L can be obtained by means of E2L, and the information of E2R can be obtained by means of E1R. The configuration in embodiments of the present description can achieve binocular human eye information compensation, and compared with a scheme of binocular coaxial arrangement, human eye tracking precision can be improved, and especially when the directions of gaze of the human eyes greatly deviate from the directly forward direction or when the user needs eye control, a better human eye tracking effect can be achieved by the compensation of two eyes.

It is to be noted that compensation calculation of two eyes can achieve a human eye tracking effect of higher precision, but it also leads to a larger amount of computation, so the compensation calculation of the two eyes can be performed only in part of the field range.

Figure 22:
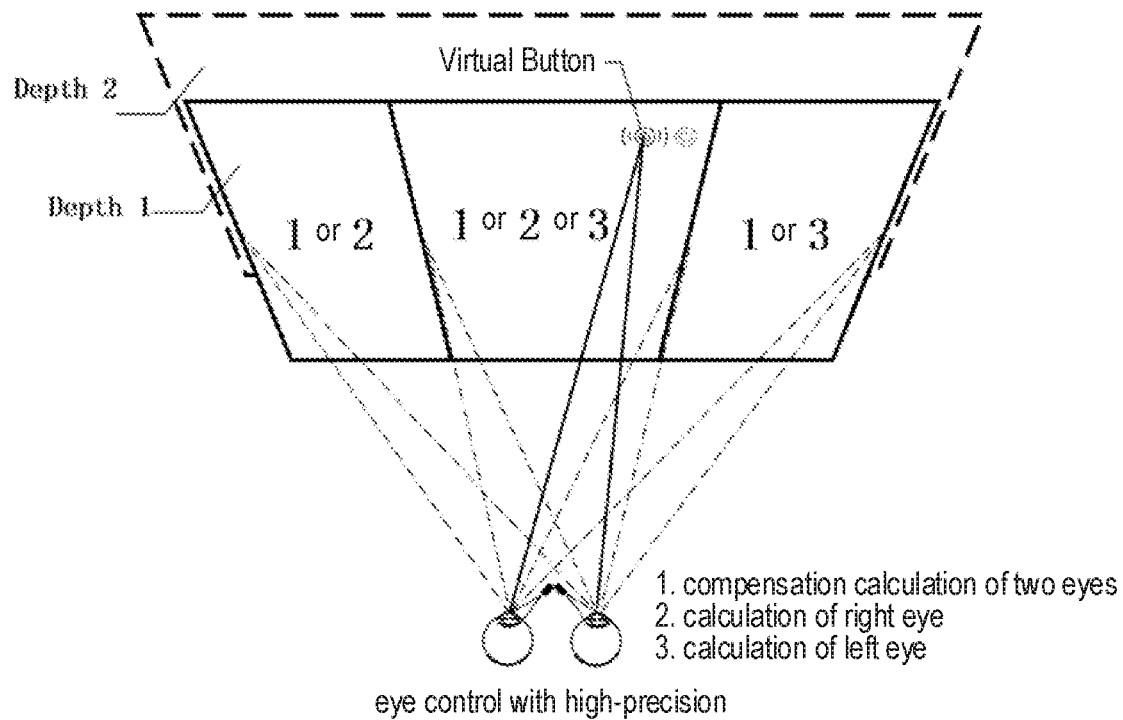
FIG. 22 shows an example schematic diagram of human eye tracking by infrared detection modules located at nose sides according to embodiments of the present description.

FIG. 22 shows an example schematic diagram of human eye tracking by an infrared detection modules located at nose sides according to embodiments of the present description. In the example shown in FIG. 22, the infrared detectors are located on the nose sides, and in the schematic diagram, the human eye tracking units are used to perform human eye tracking for different areas, at a certain depth plane in a multi-depth optical field.

As shown in FIG. 22, in a middle area (i.e., an area represented by "1 or 2 or 3" shown in the figure), a left-eye compensation, a right-eye compensation, or a compensation calculation of the two eyes can be used. In a left area (i.e., an area represented by "1 or 2" shown in the figure), a left eye compensation or a compensation calculation of two eyes can be used. In a right area (i.e., an area represented by "1 or 3" shown in the figure), a right eye compensation or a compensation calculation of two eyes can be used. In this way, human eye tracking with high-precision can be achieved.

In an example of embodiments of the present description, when a focusing position of the human eyes of the user of the head-mounted display device is detected to meet a set condition, the depth acquisition apparatus is triggered to track the human eyes of the user of the head-mounted display device using a method of compensation calculation of two eyes within a preset user field-of-view area. Here, the set condition can indicate that the compensation calculation of two eyes is triggered when the focusing position of the human eyes falls within a set range, and the user field-of-view area can be set according to the user's demand, for example being only the middle field-of-view area.

In conjunction with the application scenario, before the user uses the device, according to whether there is a demand for human eye tracking with high-precision, a virtual button can be controlled by the gaze of the human eyes. The field-of-view size of each area is specified and calculation methods are assigned in advance, to meet the high-precision demand on the one hand, and reduce the amount of computation without high-precision tracking on the other hand. Usually the field-of-view size the middle area is within ±15 degrees, and in this area, the human eyes view scenes by turning the eyeballs, while beyond this range of field-of-view, the user prefers to adjust sight lines by turning the head, so a preferred horizontal field-of-view size of the middle area is ±15 degrees, and a preferred tracking mode within this range is compensation calculation of two eyes.

Figure 23:
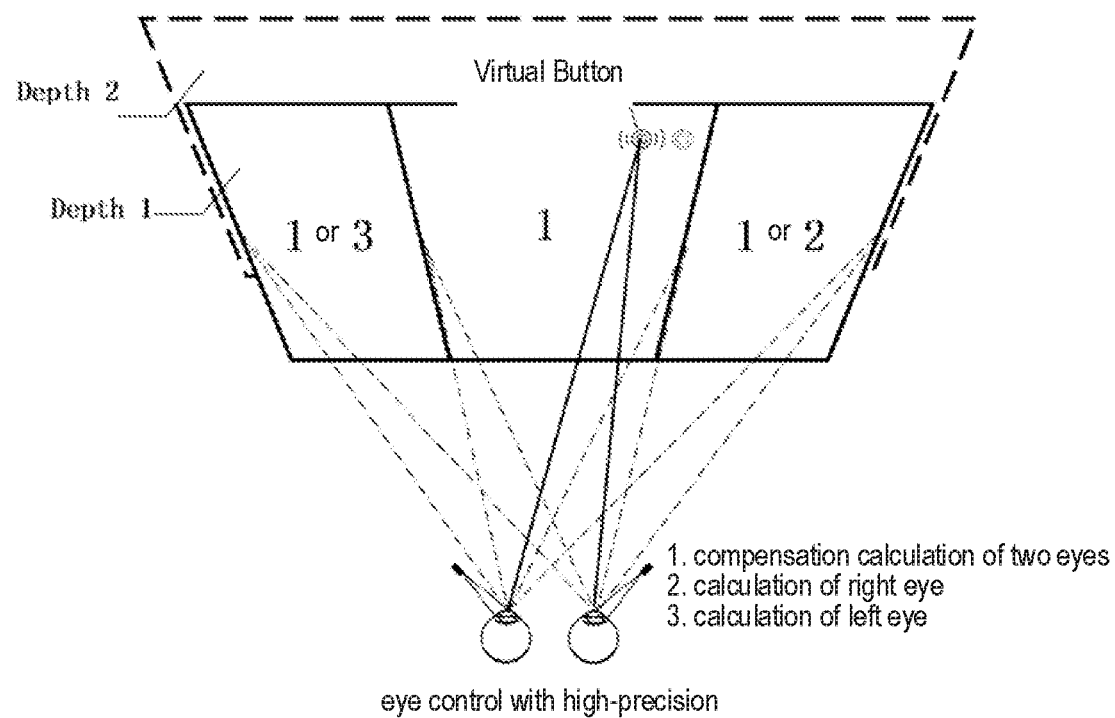
FIG. 23 shows an example schematic diagram of human eye tracking by infrared detection modules located at end pieces according to embodiments of the present description.

FIG. 23 shows an example schematic diagram of human eye tracking by infrared detection modules located at end pieces according to embodiments of the present description. In the example shown in FIG. 23, the infrared detectors are located at the end pieces, and in the schematic diagram, the human eye tracking units are used to perform human eye tracking for different areas, at a certain depth plane in a multi-depth optical field. For the specific details of the human eye tracking scheme shown in FIG. 23, reference can be made to the above relevant description made in conjunction with FIG. 22, which will not be repeated here.

Figure 24:
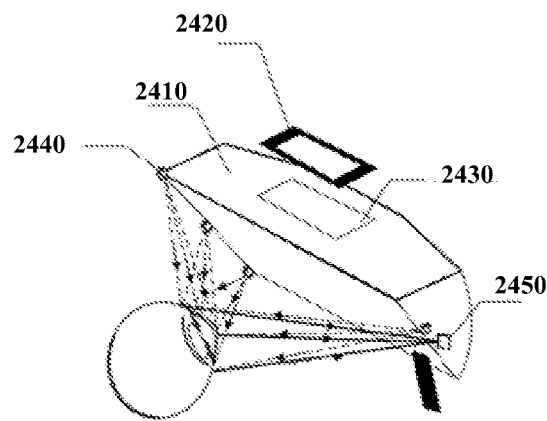
FIG. 24 shows a schematic diagram of an example of augmented reality display glasses provided with a human eye tracking unit according to embodiments of the present description.

FIG. 24 shows a schematic diagram of an example of augmented reality display glasses provided with a human eye tracking unit according to embodiments of the present description.

As shown in FIG. 24, the augmented reality display glasses 2400 include an optical imaging apparatus 2410, a displacement apparatus 2420, an image source apparatus 2430, a plurality of infrared light sources 2440, and an infrared detection module 2450. The infrared light sources 2440 are arranged on outer edges of the optical imaging apparatus 2410.

When performing human eye tracking, the infrared light source emits infrared light to irradiate the human eyes, and the infrared detection module receives an infrared image, and then analyzes the infrared image to obtain current human eye gaze point information of the user. In the present description, the infrared light sources are preferably infrared LEDs, infrared edge emitting laser diodes (LD-EELs), or vertical-cavity surface-emitting lasers (VCSELs).

Figure 25:
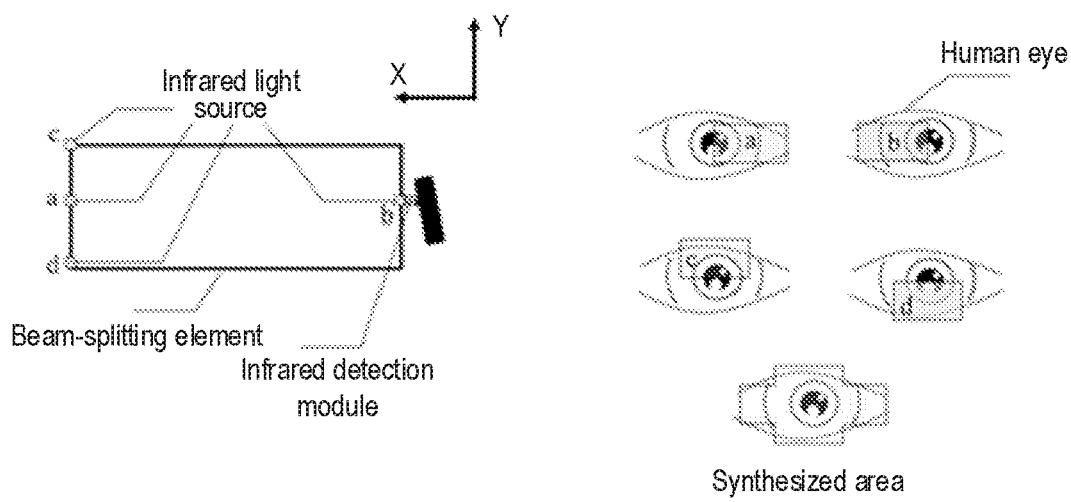
FIG. 25 shows an XY cross-sectional view of the diagram shown in FIG. 24, and a schematic diagram of illumination of corresponding human eye areas.

FIG. 25 shows an XY cross-sectional view of the diagram shown in FIG. 24, and a schematic diagram of illumination of corresponding human eye areas. As shown in FIG. 25, infrared light sources a, b, c and d are located on the left and right sides of the beam-splitting element, respectively. The infrared light source a is in the middle, the infrared light source b is adjacent to the nose pad and the infrared detection module, and the infrared light sources c and d are located in the upper left corner and the lower left corner, respectively. Due to the curvature of the human eyes, illuminated human eye areas corresponding thereto are shown in the right view in FIG. 25. By co-illumination of a, b, c and d, all areas of the human eyes are covered and the precision of off-axis detection can be improved.

Figure 26:
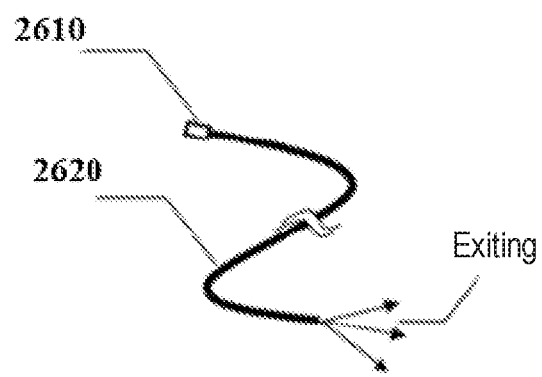
FIG. 26 shows an example schematic diagram of an infrared illumination module according to embodiments of the present description.

In an example of the present description, the infrared illumination module can be implemented by optical fiber illumination. FIG. 26 shows another example schematic diagram of an infrared illumination module according to embodiments of the present description. As shown in FIG. 26, the infrared illumination module 2600 includes an infrared light source 2610 and at least one optical fiber 2620. For the same illumination light source, the optical fiber has a smaller diameter of an end surface, and the optical fiber 2620 can implement transmission by split beams to irradiate the human eyes from different places, thereby forming a multi-light-source irradiation structure. Optionally, the optical fiber 2620 is an optical fiber of 850 nm. Optionally, the infrared light source 2610 can be a VCSEL infrared light source. The VCSEL infrared light source has the advantages of a miniature-size, low power consumption, high reliability, a small divergence angle, easy coupling with the optical fiber, and high efficiency of optical fiber coupling.

Using the infrared illumination module shown in FIG. 26, as the optical fiber can implement multi-path coupled output for a single light source, the number of infrared light sources can be reduced and the energy utilization efficiency of a single infrared light source can be increased.

Figure 27:
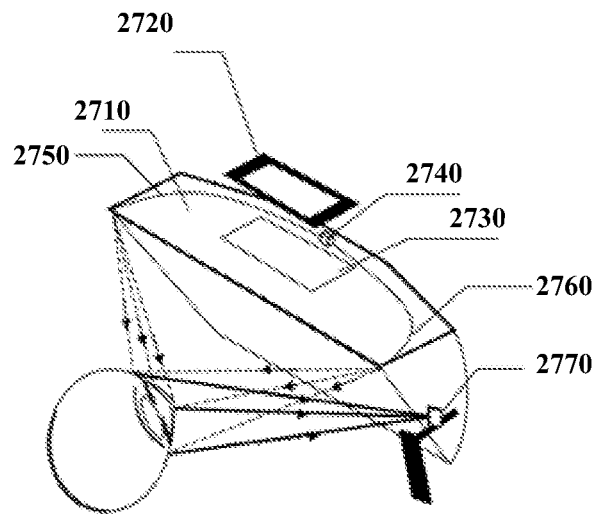
FIG. 27 shows a structural schematic diagram of another example of augmented reality display glasses provided with a human eye tracking unit according to embodiments of the present description.

FIG. 27 shows a structural schematic diagram of another example of augmented reality display glasses provided with a human eye tracking unit according to embodiments of the present description.

As shown in FIG. 27, the augmented reality display glasses 2700 include an optical imaging apparatus 2710, a displacement apparatus 2720, an image source apparatus 2730, an infrared light source 2740, a first optical fiber 2750, a second optical fiber 2760, and an infrared detection module 2770. Here, the augmented reality display glasses 2700 use two optical fiber structures. In other embodiments, more optical fiber structures can be used. The infrared light source 2740 is located on the top of the optical imaging apparatus 2710 and at a lateral side of the image source apparatus 2730.

Figure 28:
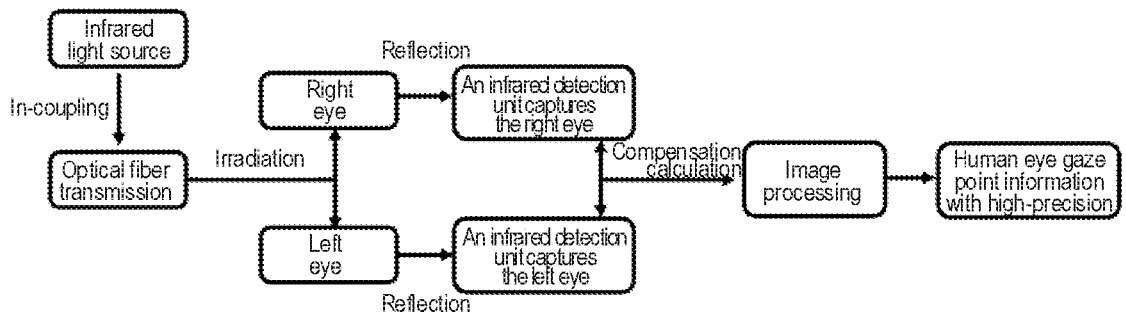
FIG. 28 shows an example flow diagram of a process for acquiring human eye gaze depth information based on optical fiber illumination according to embodiments of the present description.

FIG. 28 shows an example flow diagram of a process for acquiring human eye gaze depth information based on optical fiber illumination according to embodiments of the present description.

As shown in FIG. 28, infrared light emitted by the infrared light source is coupled into the optical fiber. The optical fiber implements transmission by split beams to form a multi-source irradiation structure, which irradiates the human eyes (two eyes) from different places. The infrared detection module captures information of two eyes and performs image processing by compensation calculation of two eyes, thus obtaining human eye gaze depth information with high-precision.

The image display control method and the head-mounted display device according to embodiments of the present description are described above with reference to FIGS. 1 to 28.

Using this method, by determining displacement information of the displacement apparatus and corresponding source image display information of the image source apparatus, based on a virtual scene display depth range, and moving the image source apparatus, based on the determined displacement information, the image source apparatus can accurately display a virtual image of a source image on a target virtual scene display depth plane. In addition, by continuous movement of the displacement apparatus, for example according to a displacement sequence, dynamic depth display of virtual images can be achieved.

In addition, using this method, by projecting a plurality source images at each time of source image projection, and performing image blurring on some or all of the source images other than a target source image, a clear virtual image of the target source image and blurred virtual images of other source images can be displayed on a single virtual scene display depth plane, and these blurred virtual images can serve as background information of a current virtual scene, thus achieving virtual scene display with a parallax effect.

Figure 29:
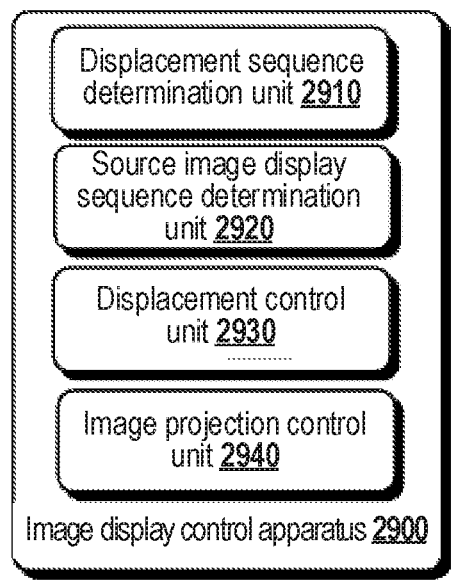
FIG. 29 shows a block schematic diagram of an image display control apparatus according to embodiments of the present description.

FIG. 29 shows a block schematic diagram of an image display control apparatus 2900 according to embodiments of the present description. As shown in FIG. 29, the image display control apparatus 2900 includes a displacement sequence determination unit 2910, a source image display sequence determination unit 2920, a displacement control unit 2930, and an image projection control unit 2940.

The displacement sequence determination unit 2910 is configured to determine a displacement sequence of a displacement apparatus, based on a virtual scene display depth range. Each displacement in the displacement sequence corresponds to a virtual scene display depth in the virtual scene display depth range. For the operation of the displacement sequence determination unit 2910, reference can be made to the operation of block 610 described above with reference to FIG. 6.

The source image display sequence determination unit 2920 is configured to determine a source image display sequence of an image source apparatus, based on the virtual scene display depth range. Each source image in the source image display sequence corresponds to one displacement in the displacement sequence. For the operation of the source image display sequence determination unit 2920, reference can be made to the operation of block 610 described above with reference to FIG. 6.

The displacement control unit 2930 is configured to control the displacement apparatus to move, according to the displacement sequence, the image source apparatus to corresponding target positions. In an example, the displacement control unit 2930 can control the displacement apparatus to sequentially or cyclically move, according to the displacement sequence, the image source apparatus to corresponding target positions. For the operation of the displacement control unit 2930, reference can be made to the operation of block 620 described above with reference to FIG. 6.

The image projection control unit 2940 is configured to, after the image source apparatus reaches each of the target positions, control, according to the source image display sequence, the image source apparatus to perform source image projection, so as to display a clear virtual image of a source image, corresponding to the target position, in the source image display sequence. For the operation of the image projection control unit 2940, reference can be made to the operation of block 630 described above with reference to FIG. 6.

In an example, the virtual scene display depth range can be generated based on a human eye gaze depth sequence of a user of a head-mounted display device. Correspondingly, the image display control unit 2940 is configured to, after the image source apparatus 230 reaches each of the target positions, control the image source apparatus 230 to select a source image, corresponding to the target position, from the source image display sequence; and control the image source apparatus 230 to project the selected source image to display a corresponding clear virtual image.

In addition, in an example, the image display control unit 2940 is configured to, after the image source apparatus 230 reaches each of the target positions, control the image source apparatus 230 to perform image blurring on a first source image set. The first source image set is obtained by removing a source image, corresponding to the target position, in the source image display sequence from a plurality of source images. Then, the image projection control unit 2940 controls the image source apparatus 230 to project the plurality of blurred source images to display a clear virtual image of the source image, corresponding to the target position, in the source image display sequence.

In another example, the first source image set can be obtained by removing, some or all of previously projected source images, and the source image, corresponding to the target position, in the source image display sequence from a source image set that the image source apparatus 230 has.

In an example, if a cyclic movement period of the image source apparatus is greater than the duration of vision of the human eyes, then at each time of source image projection, the image projection control unit 2940 is configured to control the image source apparatus 230 to perform image blurring on a specified source image in the source image set that the image source apparatus 230 has.

In another example, at each time of source image projection, the image projection control unit 2940 can control the image source apparatus 230 to perform image blurring on all source images whose virtual scene display depths are outside the virtual scene display depth range, in the source image set that the image source apparatus has.

Embodiments of the image display control method, the image display control apparatus, and the head-mounted display device according to embodiments of the present description are described above with reference to FIGS. 2 to 29. The details mentioned in the above description of the method embodiments also apply to apparatus embodiments of the present description. The above-mentioned image display control apparatus can be implemented in hardware, and can also be implemented in software, or a combination of hardware and software.

Figure 30:
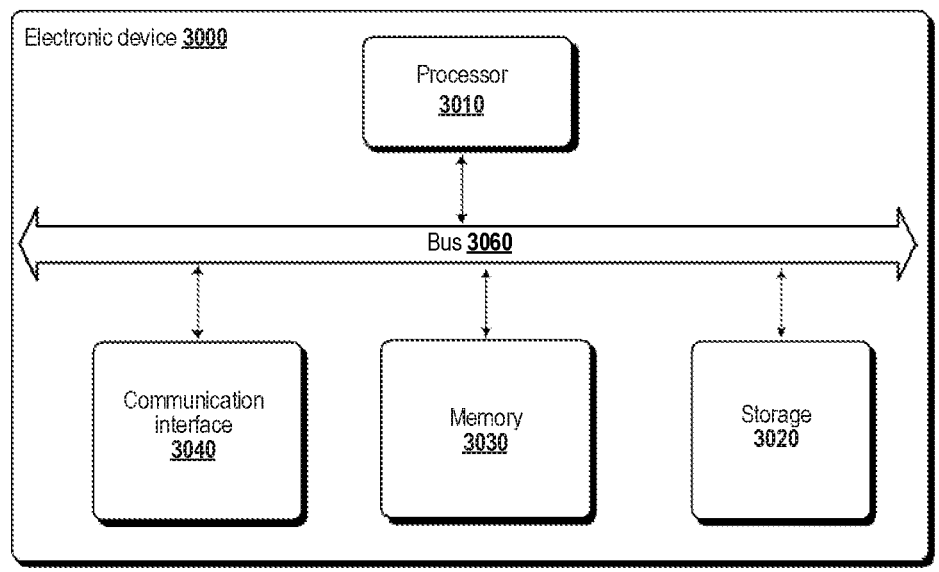
FIG. 30 shows an example hardware structure diagram of an electronic device for implementing image display control of a head-mounted display device according to embodiments of the present description.

FIG. 30 shows an example hardware structure diagram of an electronic device for implementing image display control of a head-mounted display device according to embodiments of the present description. As shown in FIG. 30, the electronic device 3000 can include at least one processor 3010, a storage (such as a nonvolatile memory) 3020, a memory 3030, and a communication interface 3040, and the at least one processor 3010, the storage 3020, the memory 3030 and the communication interface 3040 are connected together via a bus 3060. The at least one processor 3010 executes at least one computer readable instruction (i.e., an element implemented in software form as described above) stored or encoded in the storage.

In an embodiment, the storage stores computer-executable instructions which, when executed, cause the at least one processor 3010 to: based on a virtual scene display depth range, determine a displacement sequence of a displacement apparatus and a source image display sequence of an image source apparatus, each displacement in the displacement sequence corresponding to a source image in the source image display sequence and to a virtual scene display depth in the virtual scene display depth range; control the displacement apparatus to move, according to the displacement sequence, the image source apparatus to corresponding target positions: and after the image source apparatus reaches each of the target positions, control, according to the source image display sequence, the image source apparatus to perform source image projection, so as to display a clear virtual image of a source image, corresponding to the target position, in the source image display sequence.

It should be understood that the computer-executable instructions stored in the storage, when executed, cause the at least one processor 3010 to perform the various operations and functions described above in connection with FIGS. 2 to 29 in embodiments of the present description.

In the present description, electronic device 3000 can include, but is not limited to, a personal computer, a server computer, a workstation, a desktop computer, a laptop computer, a notebook computer, a mobile electronic device, a smart phone, a tablet computer, a cellular phone, a personal digital assistant (PDA), a handheld apparatus, a message transceiver device, a wearable electronic device, a consumer electronic device, and the like.

According to an embodiment, a program product such as a machine-readable medium is provided. The machine-readable medium can have instructions (i.e., elements implemented in software form as described above) which, when executed by a machine, cause the machine to perform the various operations and functions described above in connection with FIGS. 2 to 29 in embodiments of the present description. Specifically, a system or apparatus with a readable storage medium can be provided, wherein software program codes implementing the functions of any of the above embodiments is stored on the readable storage medium, and a computer or processor of the system or apparatus is caused to read and execute the instructions stored in the readable storage medium.

In this case, the program codes read from the readable medium can itself implement the functions of any of the above embodiments, so the machine-readable codes and the readable storage medium storing the machine-readable code form part of the present invention.

Embodiments of the readable storage medium include a floppy disk, a hard disk, a magnetic optical disk, an optical disk (e.g., CD-ROM, CD-R, CD-RW, DVD-ROM, DVD-RAM, DVD-RW, and DVD-RW), a magnetic tape, a non-volatile memory card, and an ROM. Optionally, the program codes can be downloaded from a server computer or from a cloud via a communication network.

In an embodiment, an image display control method for a head-mounted display device is disclosed. The head-mounted display device including an optical imaging apparatus, an image source apparatus, a displacement apparatus, and an image display control apparatus. The image source apparatus is optically aligned with the optical imaging apparatus, and the image source apparatus has a plurality of source images. Each source image has a different virtual scene depth. The method is applied to an image display control apparatus. The method includes: determining a displacement sequence of the displacement apparatus and a source image display sequence of the image source apparatus based on a virtual scene display depth range, each displacement in the displacement sequence corresponding to one source image in the source image display sequence and to one virtual scene display depth in the virtual scene display depth range; for any virtual scene display depth, determining from a pre-established correspondence relationship a displacement corresponding to the virtual scene display depth, and determining a source image corresponding to the virtual scene display depth; controlling the displacement apparatus to move, according to the determined displacement, to a target position, and controlling the image source apparatus to project a virtual image of the determined source image at the virtual scene display depth.

In an embodiment, an image display control method for a head-mounted display device is disclosed. The head-mounted display device includes an optical imaging apparatus, an image source apparatus, a displacement apparatus, and an image display control apparatus. The image source apparatus is optically aligned with the optical imaging apparatus. The image source apparatus and the optical imaging apparatus are configured as an object-side telecentric optical path. The image source apparatus has a plurality of source images. Each source image has a different virtual scene depth. The method is applied to an image display control apparatus. The method includes: determining a displacement sequence of the displacement apparatus and a source image display sequence of the image source apparatus, based on a virtual scene display depth range, each displacement in the displacement sequence corresponding to one source image in the source image display sequence and to one virtual scene display depth in the virtual scene display depth range; for any virtual scene display depth, determining from a pre-established correspondence relationship a displacement corresponding to the virtual scene display depth, and controlling the displacement apparatus to move, according to the displacement, the image source apparatus to a corresponding target position; and determining from a pre-established correspondence relationship a source image corresponding to the virtual scene display depth, and determining a first source image set for processing to obtain an out-of-focus source image with an out-of-focus display effect; and after the image source apparatus reaches the target position, controlling the image source apparatus to project the determined source image and the out-of-focus source image, wherein source images in the first source image set are different from the determined source image, and the first source image set at least includes a source image that is not projected in the source image display sequence.

It should be understood by those skilled in the art that various variations and modifications can be made to the embodiments of the above description without departing from the essence of the present invention. Thus, the protection scope of the present invention should be defined by the appended claims.

It is to be noted that not all of the steps and units in the above processes and system structural diagrams are necessary, and some steps or units can be omitted depending on actual needs. The order of execution of the steps is not fixed and can be determined as needed. The apparatus structures described in the above embodiments can be physical structures, and can also be logical structures, i.e., some units may be implemented by the same physical entity, or some units may be implemented respectively by a plurality of physical entities, or can be implemented jointly by some components of a plurality of independent devices.

In the above embodiments, hardware units or modules can be implemented in a mechanical way or electrical way. For example, a hardware unit, module or processor can include permanently dedicated circuitry or logic (such as a dedicated processor, FPGA or ASIC) to perform a corresponding operation. The hardware unit or processor can also include programmable logic or circuitry (such as a general-purpose processor or other programmable processor), which can be temporarily set by software to perform an appropriate operation. The specific way of implementation (mechanical way, or dedicated permanent circuits, or temporarily set circuitry) can be determined based on cost and time considerations.

The specific implementations set forth above in conjunction with the accompanying drawings describe exemplary embodiments, but do not represent all embodiments that can be implemented or fall within the scope of protection of the claims. The term "exemplary" used throughout the description means "used as an example, instance or illustration" and does not mean "preferred" or "advantageous" over other embodiments. For the purpose of providing understanding of the described technology, specific implementations include specific details. However, the technology can be implemented without the specific details. In some examples, to avoid making the concepts in the described embodiments difficult to understand, commonly known structures and apparatuses are shown in the form of block diagrams.

The foregoing description of the present disclosure is provided to enable any person of ordinary skill in the art to implement or use the present disclosure. Various modifications to the present disclosure are obvious to those of ordinary skill in the art, and the general principles defined herein can also be applied to other variations without departing from the scope of protection of the present disclosure. Thus, the present disclosure is not limited to the examples and designs described herein, but is consistent with the broadest scope conforming to the principles and novelty features of the present disclosure.

The invention claimed is:

1. An image display control method for a head-mounted display device, the head-mounted display device comprising an optical imaging apparatus, an image source apparatus, a displacement apparatus, and an image display control apparatus, the image source apparatus being optically aligned with the optical imaging apparatus and having a plurality of source images, each source image having a different virtual scene display depth, the method being implemented by the image display control apparatus, the image display control method comprising:

determining a displacement sequence of the displacement apparatus and a source image display sequence of the image source apparatus based on a virtual scene display depth range, each displacement in the displacement sequence corresponding to one source image in the source image display sequence and to one virtual scene display depth in the virtual scene display depth range;

controlling the displacement apparatus to move, according to the displacement sequence, the image source apparatus to corresponding target positions; and after the image source apparatus reaches each of the target positions, controlling, according to the source image display sequence, the image source apparatus to perform source image projection, so as to display a clear virtual image of a source image, corresponding to the target position, in the source image display sequence.

2. The image display control method according to claim 1, wherein after the image source apparatus reaches each of the target positions, controlling, according to the source image display sequence, the image source apparatus to perform source image projection comprises:

after the image source apparatus reaches each of the target positions, controlling the image source apparatus to perform image blurring on a first source image set, the first source image set being obtained by removing a source image, corresponding to the target position, in the source image display sequence from the plurality of source images; and controlling the image source apparatus to project the plurality of blurred source images to display a clear virtual image of the source image, corresponding to the target position, in the source image display sequence.

3. The image display control method according to claim 2, wherein the first source image set is obtained by removing some or all of previously projected source images, and the source image, corresponding to the target position, in the source image display sequence from the plurality of source images.

4. The image display control method according to claim 1, wherein each source image of the plurality of source images having a virtual scene display depth outside the virtual scene display depth range is in an image blurred state at each time of source image projection.

5. The image display control method according to claim 1, wherein controlling the displacement apparatus to move, according to the displacement sequence, the image source apparatus to corresponding target positions comprises:
controlling the displacement apparatus to sequentially or cyclically move, according to the displacement sequence, the image source apparatus to corresponding target positions.

6. The image display control method according to claim 5, wherein if a cyclic movement period of the image source apparatus is greater than a duration of vision of human eyes, a specified source image of the plurality of source images is in an image blurred state at each time of source image projection.

7. The image display control method according to claim 1, wherein the virtual scene display depth range is generated based on a human eye gaze depth sequence of a user of the head-mounted display device.

8. The image display control method according to claim 7, wherein the human eye gaze depth sequence is acquired by a depth acquisition apparatus.

9. The image display control method according to claim 1, wherein after the image source apparatus reaches each of the target positions, controlling, according to the source image display sequence, the image source apparatus to perform source image projection comprises:
for a certain target position of the target positions, after the image source apparatus reaches the target position, controlling the image source apparatus to select a source image corresponding to the target position from the source image display sequence; and
controlling the image source apparatus to project the selected source image to display a corresponding clear virtual image.

10. The image display control method according to claim 1, wherein the virtual scene display depth range is determined according to a human eye gaze depth range of a user of the head-mounted display device.

11. The image display control method according to claim 1, wherein the virtual scene display depth range is determined according to a movable range of the image source apparatus.

12. The image display control method according to claim 1, further comprising:
rapidly moving the displacement apparatus so that a time interval of the displacement apparatus moving from any target position to another target position is less than or equal to a duration of vision of human eyes; and
after the displacement apparatus is moved each time, controlling the image source apparatus to project a corresponding source image so that a time interval of updated display of virtual images with different depth information less than or equal to the duration of vision of human eyes.

13. The image display control method according to claim 2, wherein controlling the image source apparatus to perform image blurring on a first source image set comprises:
performing low-pass filtering smoothing on image sources in the first image source set to obtain out-of-focus source images with an out-of-focus display effect; and
determining the obtained out-of-focus image sources as blurred source images.

14. A head-mounted display device, comprising:
an optical imaging apparatus;
an image source apparatus optically aligned with the optical imaging apparatus, having a plurality of source images, each source image having a different virtual scene depth;
a displacement apparatus; and
an image display control apparatus configured to perform an image display control method, the method comprising:
determining a displacement sequence of the displacement apparatus and a source image display sequence of the image source apparatus based on a virtual scene display depth range, each displacement in the displacement sequence corresponding to one source image in the source image display sequence and to one virtual scene display depth in the virtual scene display depth range;
for any virtual scene display depth, determining from a pre-established correspondence relationship a displacement corresponding to the virtual scene display depth, and determining a source image corresponding to the virtual scene display depth;
controlling the displacement apparatus to move, according to the displacement, the image source apparatus to a target position; and
controlling the image source apparatus at the target position to project a clear virtual image of the determined source image at the virtual scene display depth and a blurred virtual image of a source image not corresponding to the virtual scene display depth.

15. The head-mounted display device according to claim 14, wherein the source image not corresponding to the virtual scene display depth comprises remain source images of the plurality of source images except the determined source image.

16. The head-mounted display device according to claim 14, wherein the source image not corresponding to the virtual scene display depth comprises remain source images of the plurality of source images except the determined source image and previously projected source images.

17. The head-mounted display device according to claim 14, wherein controlling the displacement apparatus to move, according to the determined displacement, the image source apparatus to a target position comprises:
controlling the displacement apparatus to sequentially or cyclically move, according to the displacement sequence, the image source apparatus to a target position,
if a cyclic movement period of the image source apparatus is greater than a duration of vision of human eyes, a specified source image of the plurality of source images is in an image blurred state at each time of source image projection.

18. The head-mounted display device according to claim 14, further comprises a depth acquisition apparatus configured to acquire a human eye gaze depth in real time, the displacement is further determined according to the human eye gaze depth, the human eye gaze depth corresponds to the virtual scene display depth.

19. The image display control method according to claim 14, wherein the image source apparatus and the optical imaging apparatus are configured as an object-side telecentric optical path.

20. An image display control method for a head-mounted display device, the head-mounted display device comprising an optical imaging apparatus, an image source apparatus, a displacement apparatus, and an image display control apparatus, the image source apparatus being optically aligned with the optical imaging apparatus, the image source apparatus and the optical imaging apparatus being configured as an object-side telecentric optical path, the image source apparatus having a plurality of source images, each source image having a different virtual scene depth, the method comprising:

determining a displacement sequence of the displacement apparatus and a source image display sequence of the image source apparatus based on a virtual scene display depth range, each displacement in the displacement sequence corresponding to one source image in the source image display sequence and to one virtual scene display depth in the virtual scene display depth range;

controlling the image source apparatus to perform image blurring on a specified source image, so that at each time of source image projection, the specified source image is not clearly displayed, wherein a cyclic movement period of the image source apparatus is greater than a duration of vision of human eyes;

for any virtual scene display depth, determining from a pre-established correspondence relationship a displacement corresponding to the virtual scene display depth, controlling the displacement apparatus to move, according to the displacement, the image source apparatus to a corresponding target position, and determining from a pre-established correspondence relationship a source image corresponding to the virtual scene display depth;

after the image source apparatus reaches the target position, controlling the image source apparatus to perform source image projection, so as to display a clear virtual image of the determined source image.

\* \* \* \* \*